(12) United States Patent  
Ito

(10) Patent No.: US 6,307,615 B1
(45) Date of Patent: Oct. 23, 2001

(54) IMAGE PROCESSING APPARATUS, IMAGE PROCESSING METHOD AND IMAGE PROCESSING SYSTEM

(75) Inventor: Hirohiko Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/432,280

(22) Filed: Nov. 2, 1999

(30) Foreign Application Priority Data

Nov. 4, 1998 (JP) .................................................. 10-313241

(51) Int. Cl.[7] ........................... G06K 15/00; G03B 27/52
(52) U.S. Cl. ................................ 355/40; 355/41; 358/1.14
(58) Field of Search ........................... 355/27–29, 40–41; 358/1.16, 296, 404, 444; 395/110, 114, 115

(56) References Cited

U.S. PATENT DOCUMENTS 5,717,841 * 2/1998 Farrell et al. .......................... 395/114
6,055,067 * 4/2000 Matsuda et al. ...................... 358/468
6,064,490 * 5/2000 Minamizawa ....................... 358/1.14

* cited by examiner

Primary Examiner—Russell Adams
Assistant Examiner—Hung Henry Nguyen
(74) Attorney, Agent, or Firm—Fitzpatrick, Cella, Harper & Scinto

(57) ABSTRACT

An image processing apparatus includes a temporary storage unit for temporarily storing image data, and a secondary storage unit for storing the image data temporarily stored in the temporary storage unit, a capacity of the secondary storage unit being larger than that of the temporary storage unit. In the apparatus, image processing of one unit to be executed is divided into an image input job to input the image data from an image input unit and an image output job to output the image data to an image output unit, and each of execution of the image input job and execution of the image output job is independently controlled according to an abnormality detection result of the secondary storage unit, whereby an unexecutable state of an image processing operation is avoided even if the secondary storage unit is in an abnormal state, and thus the image processing operation is effectively performed.

64 Claims, 15 Drawing Sheets

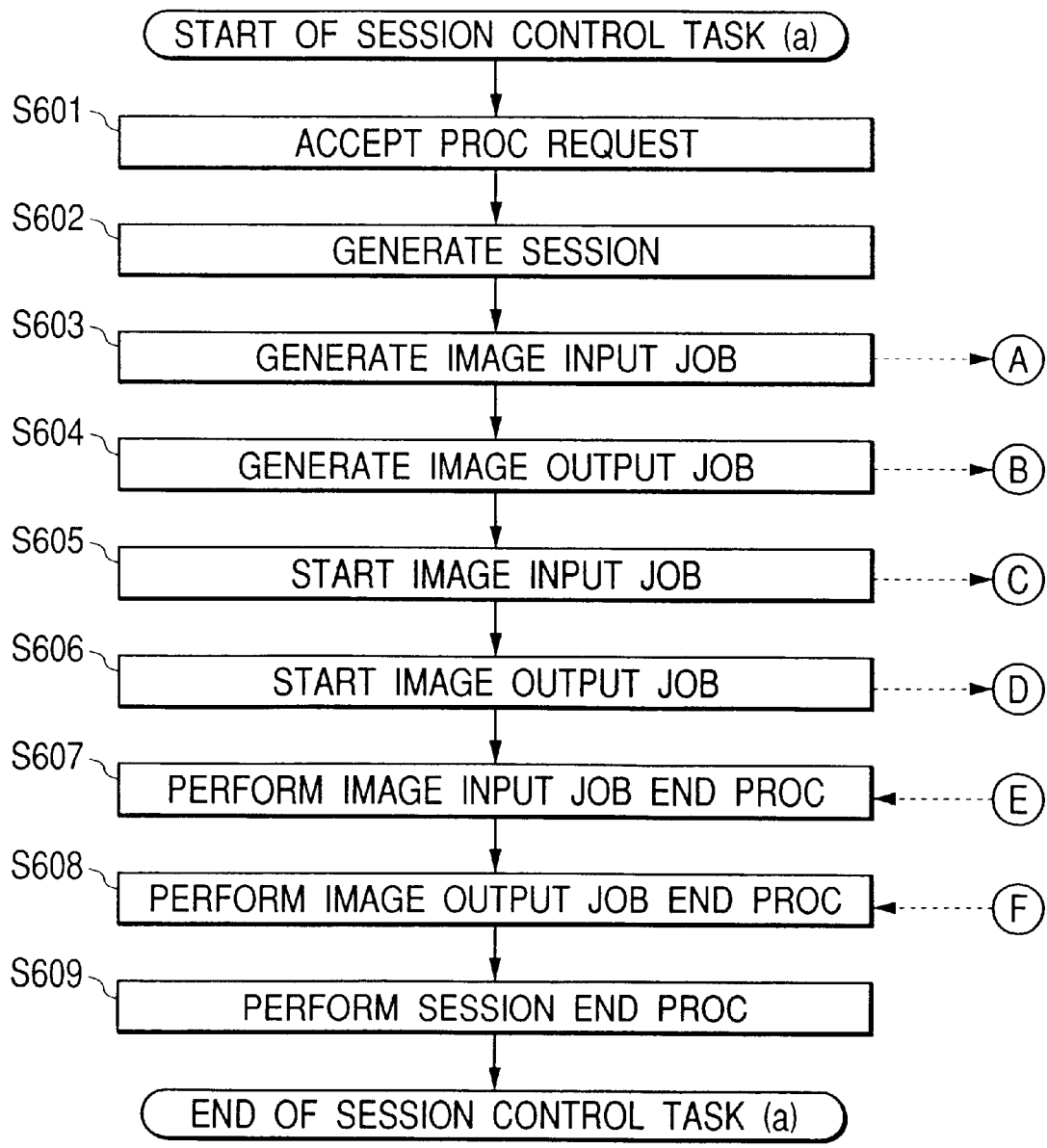

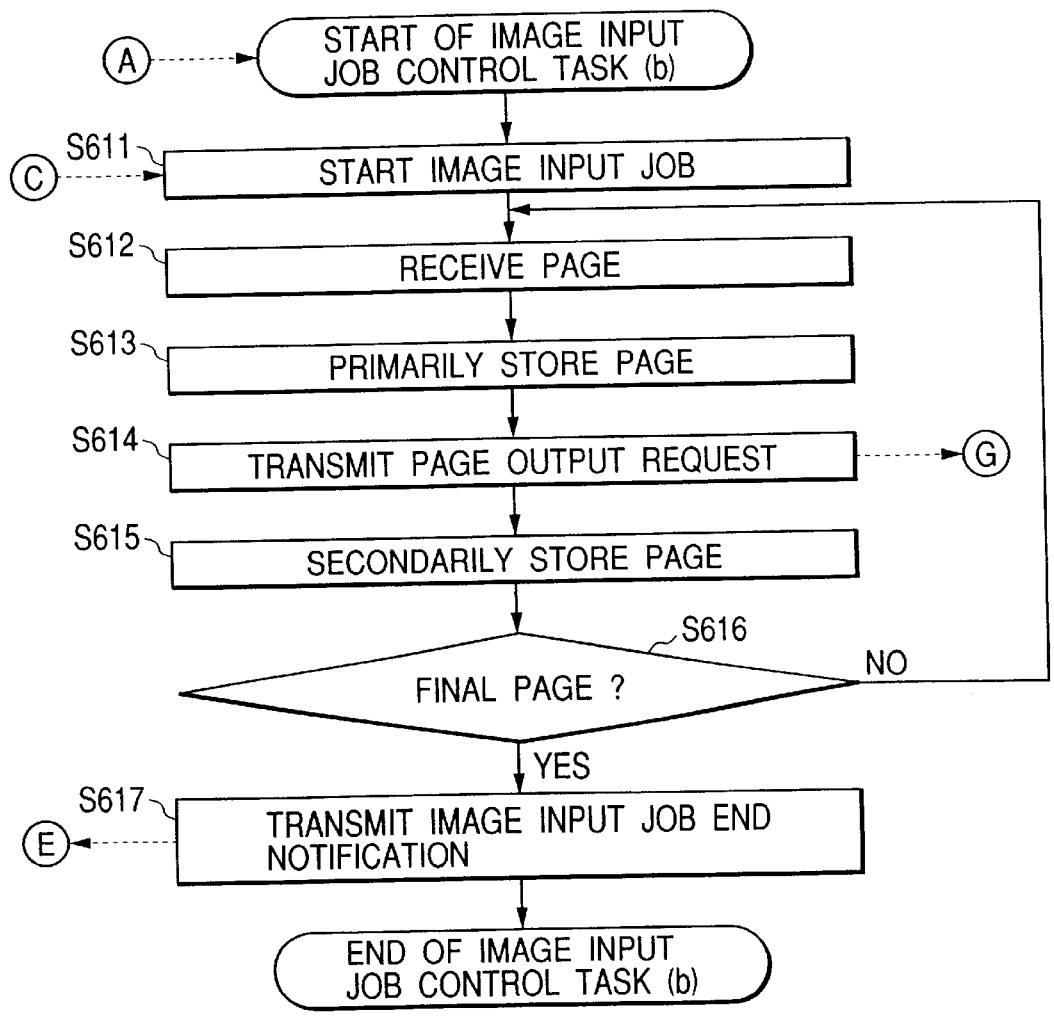

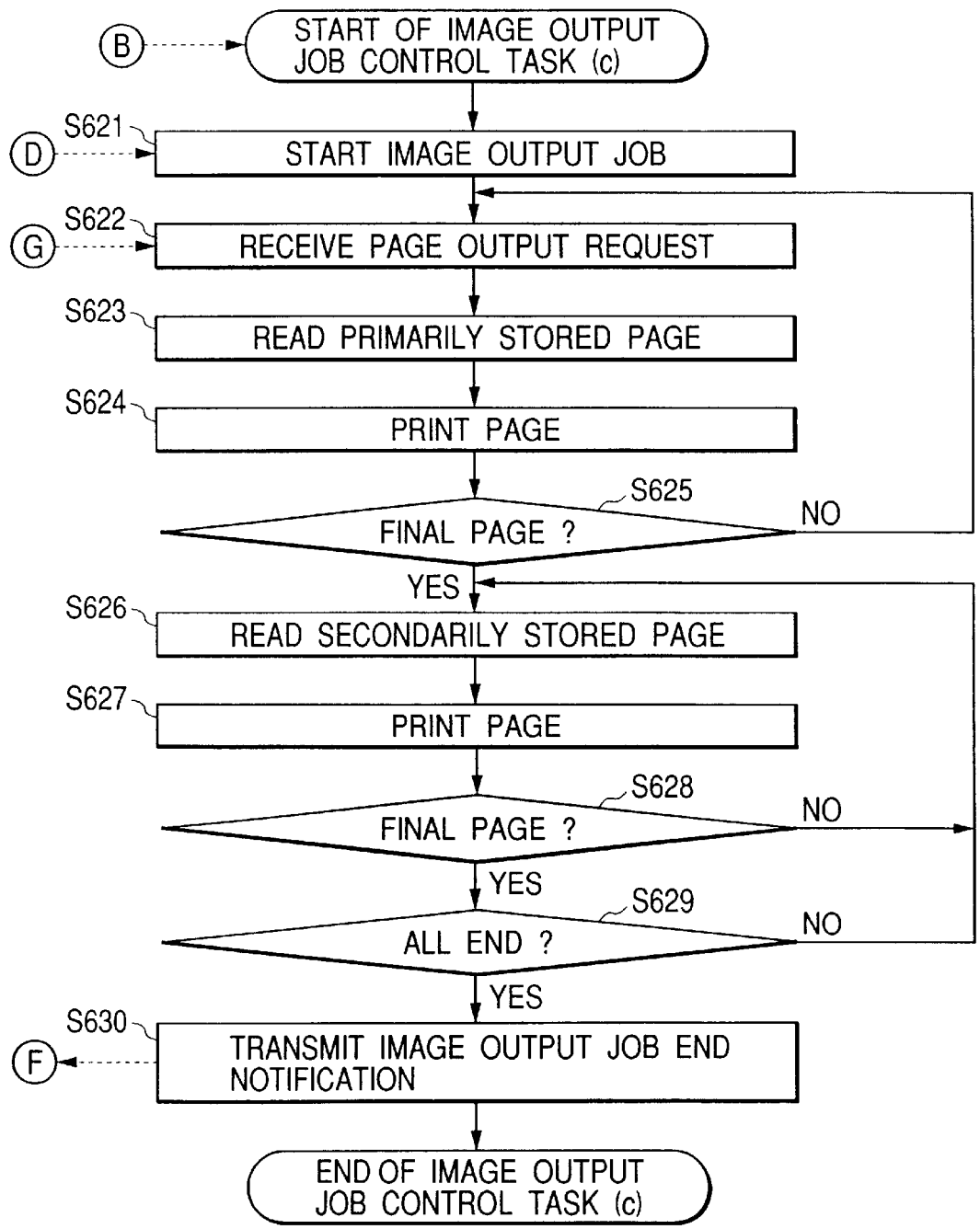

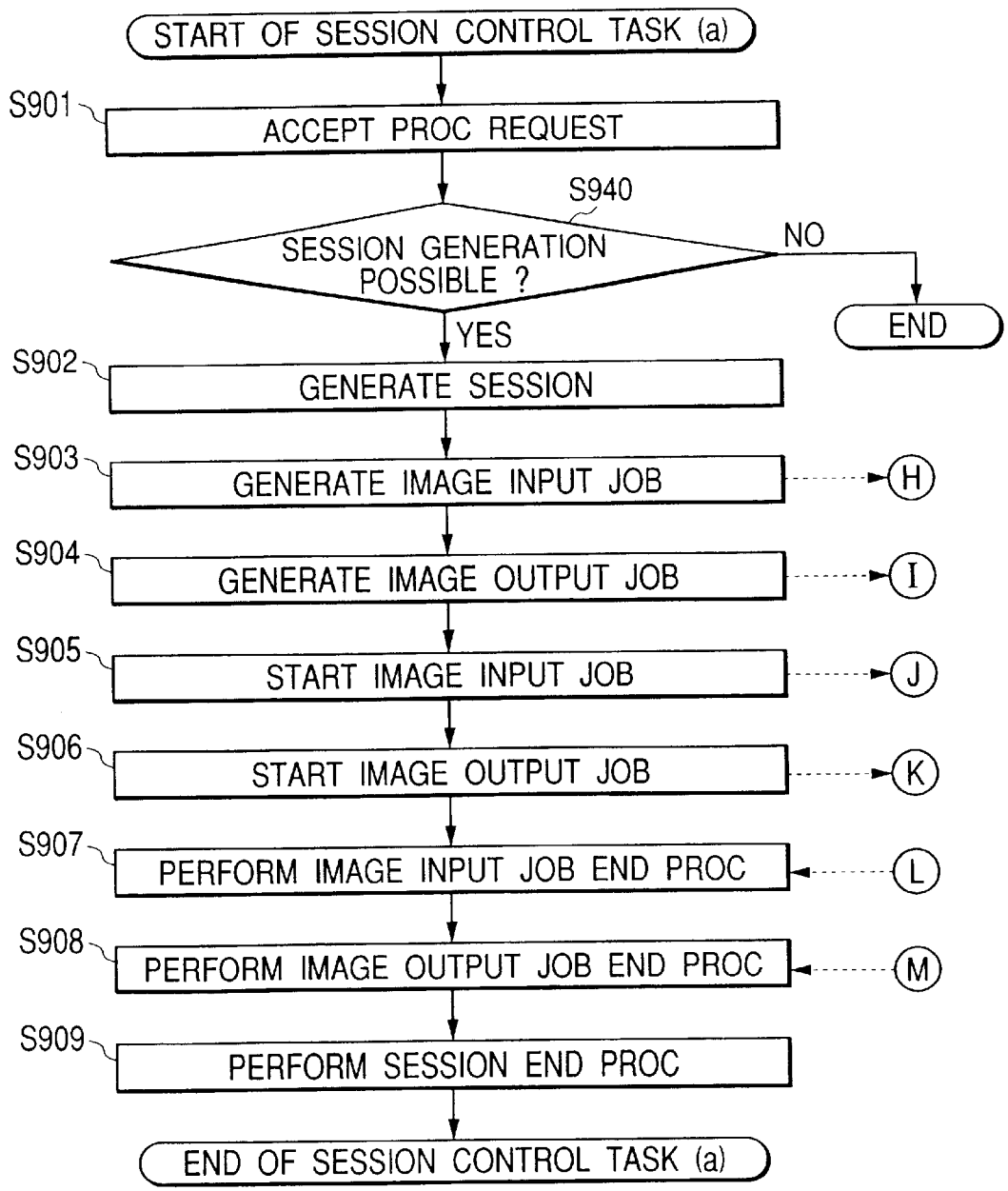

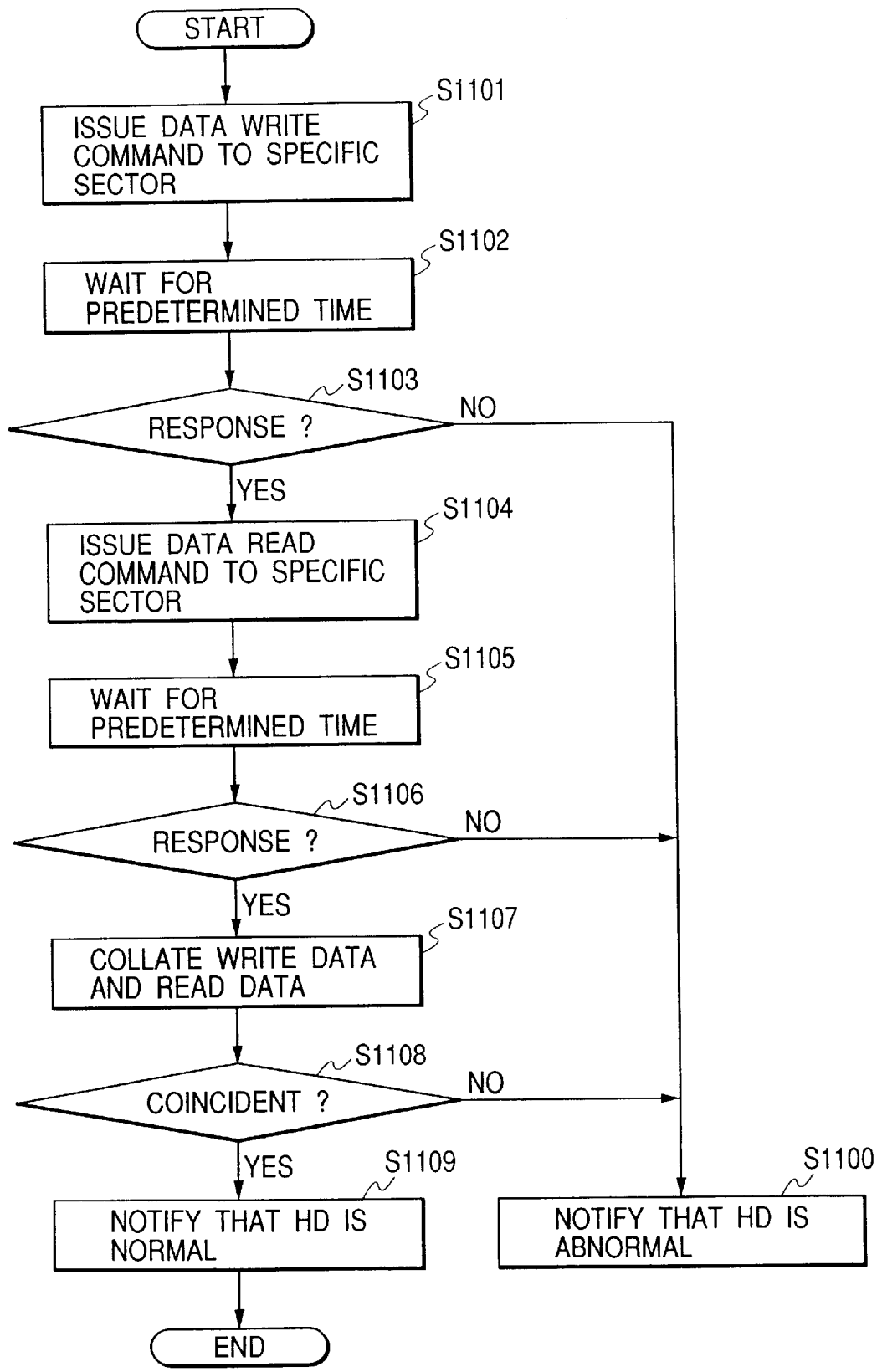

IMAGE PROCESSING APPARATUS, IMAGE PROCESSING METHOD AND IMAGE PROCESSING SYSTEM

BACKGROUND OF THE INVENTION

1. Field of the Invention

The present invention relates to an image processing apparatus, an image processing method and an image processing system each of which inputs and outputs various image data through a storage medium.

2. Related Background Art

In connection with digitization of a copying machine in recent years, a multifunctional machine having plural functions has been put to practical use. In this machine, facsimile transmission and reception are performed by using a scanner and a printer of the copying machine, and PDL (page description language) data from a computer or the like is expanded (or decompressed) and printed out. Such the multifunctional machine is structured to be able to operate not only for a single function such as a copy function, a facsimile function, a PDL printing function or the like, but also for plural functions. For example, this machine can operate when a PDL expanded image is facsimile transmitted. Further, it is structured that, if the multifunctional machine is connected to various apparatuses such as the computer and the like through a LAN (local area network), such the computer and the like can use the functions of this machine.

Further, in such the multifunctional machine, by sharing a control program of a printer part with the copy function, the PDL printing function, a facsimile printing function and the like, and by sharing a control program of a reader part with the copy function, a facsimile reading function, a scanning function and the like, a capacity of the control programs for realizing the respective functions can be reduced, it is possible to economically and simply realize a desired function.

Further, such the multifunctional machine contains a large-capacity hard disk for storing the image data. Thus, by inputting a read image transferred from a scanner, the PDL expanded image, a facsimile-received document and the like into the hard disk, by repeatedly outputting the images and documents stored in the hard disk to a printer and the like, and by combining the images of plural pages stored in the hard disk with others and outputting the combined image, it is possible to perform effective image processing.

However, in such the conventional multifunctional machine containing the large-capacity hard disk, in general, it is structured to always or surely perform the image inputting and outputting through the hard disk. Therefore, there is a problem that, if the hard disk can not be used for some reasons, the image processing operation can not be performed.

SUMMARY OF THE INVENTION

The present invention has been made in consideration of the above-described conventional problem, and an object thereof is to provide an image input/output control apparatus, an image input/output method and an image processing system wherein an inexecutable state of an image processing operation is excluded as much as possible and thus the operation can be effectively performed.

In an image processing apparatus which comprises a temporary storage means for temporarily storing image data, and a secondary storage means for storing the image data temporarily stored in the temporary storage means, a capacity of the secondary storage means being larger than that of the temporary storage means, another object of the present invention is to exclude an inexecutable state of an image processing operation even if the secondary storage means is in an abnormal state and enable effective image processing, because the image processing of one unit to be executed is divided into an image input job to input the image data from an image input unit and an image output job to output the image data to an image output unit, and each of execution of the image input job and execution of the image output job is independently controlled according to an abnormality detection result of the secondary storage means.

Further, in an image processing apparatus which comprises a temporary storage means for temporarily storing image data, and a secondary storage means for storing the image data temporarily stored in the temporary storage means, a capacity of the secondary storage means being larger than that of the temporary storage means, still another object of the present invention is to enable effective image processing suitable for a situation of the secondary storage means, because the image data is processed in accordance with an image processing parameter representing the image processing to be executed and an abnormality detection result of the secondary storage means.

That is, the present invention is to provide an image input/output apparatus comprising:

input means for inputting image data from at least one image input unit;

temporary storage means for temporarily storing the image data;

secondary storage means for storing the image data temporarily stored in the temporary storage means, a capacity of the secondary storage means being larger than that of the temporary storage means;

output means for outputting the image data to at least one image output unit;

detection means for detecting abnormality of the secondary storage means; and control means for controlling the input and output of the image data in accordance with an image processing parameter representing image processing of one unit to be executed, wherein the control means divides the image processing represented by the image processing parameter into an image input job to input the image data with the input means and an image output job to output the image data with the output means, and the control means independently controls execution of the image input job and execution of the image output job in accordance with the abnormality detection result of the secondary storage means obtained by the detection means.

Further, the present invention is to provide an image input/output method for an image input/output apparatus which comprises temporary storage means for temporarily storing image data, and secondary storage means for storing the image data temporarily stored in the temporary storage means, a capacity of the secondary storage means being larger than that of the temporary storage means, and wherein the image data is input from at least one image input unit, and the input image data is output to at least one image output unit, the method comprising:

a step of dividing image processing of one unit to be executed into an image input job to input the image data from the input means and an image output job to output the image data to the output means;

a step of detecting abnormality of the secondary storage means; and a step of independently controlling execution of the image input job and execution of the image output job in accordance with the abnormality detection result of the secondary storage means.

Further, the present invention is to provide an image processing system which outputs image data input from at least one image input means to at least one image output means, comprising:

temporary storage means for temporarily storing the image data;

secondary storage means for storing the image data temporarily stored in the temporary storage means, a capacity of the secondary storage means being larger than that of the temporary storage means;

detection means for detecting abnormality of the secondary storage means; and control means for controlling the input and output of the image data in accordance with an image processing parameter representing image processing of one unit to be executed, wherein the control means divides the image processing represented by the image processing parameter into an image input job to input the image data from the image input means and an image output job to output the image data to the image output means, and the control means independently controls execution of the image input job and execution of the image output job in accordance with the abnormality detection result of the secondary storage means obtained by the detection means.

Further, the present invention is to provide an image processing apparatus comprising:

input means for inputting image data from at least one image input unit;

temporary storage means for temporarily storing the image data;

secondary storage means for storing the image data temporarily stored in the temporary storage means, a capacity of the secondary storage means being larger than that of the temporary storage means;

output means for outputting the image data to at least one image output unit;

detection means for detecting abnormality of the secondary storage means; and processing means for processing the image data in accordance with an image processing parameter representing image processing to be executed and the abnormality detection result of the secondary storage means obtained by the detection means.

Further, the present invention is to provide an image processing method for an image processing apparatus which comprises temporary storage means for temporarily storing image data, and secondary storage means for storing the image data temporarily stored in the temporary storage means, a capacity of the secondary storage means being larger than that of the temporary storage means, and wherein the image data is input from at least one image input unit, and the input image data is output to at least one image output unit, the method comprising:

a step of detecting abnormality of the secondary storage means; and a step of processing the image data in accordance with an image processing parameter representing image processing to be executed and the abnormality detection result of the secondary storage means.

Further, the present invention is to provide an image processing system which outputs image data input from at least one image input means to at least one image output means, comprising:

temporary storage means for temporarily storing the image data;

secondary storage means for storing the image data temporarily stored in the temporary storage means, a capacity of the secondary storage means being larger than that of the temporary storage means;

detection means for detecting abnormality of the secondary storage means; and processing means for processing the image data in accordance with an image processing parameter representing image processing to be executed and the abnormality detection result of the secondary storage means obtained by the detection means.

Other objects and features of the present invention will become apparent from the following detailed description and the attached drawings.

BRIEF DESCRIPTION OF THE DRAWINGS

FIG. 6, which is comprised of FIGS. 6A, 6B and 6C, is a flow chart showing an example of image input/output control;

FIG. 11 is a flow chart showing an abnormality detection operation.

DETAILED DESCRIPTION OF PREFERRED EMBODIMENT

Figure 1:
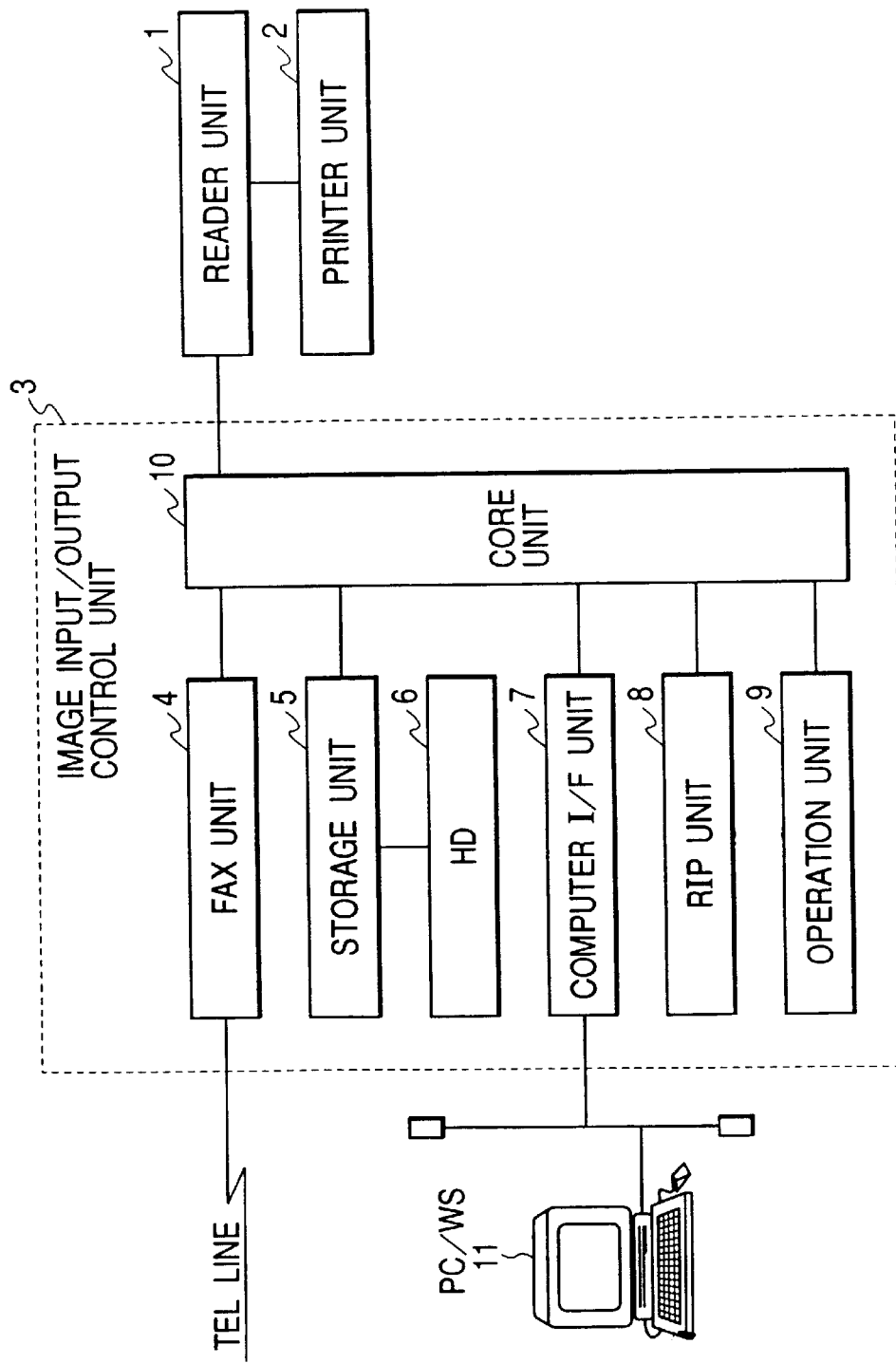
FIG. 1 is a block diagram showing an image input/output control apparatus according to the embodiment of the present invention.

FIG. 1 is a block diagram showing a structure of an image input/output control apparatus to which the present invention is applied.

In FIG. 1, a reader unit 1 photoelectrically reads an image on an original by a CCD image sensor or the like, and outputs image data corresponding to the original image to an image input/output control unit 3. A printer unit 2 such as a laser beam printer records an image corresponding to the image data transferred from the control unit 3, onto a recording sheet. The image input/output control unit 3 is connected to the reader unit 1 and the printer unit 2, and composed of a facsimile unit 4, a storage unit 5, a computer I/F (interface) unit 7, an RIP (raster image processor) unit 8, an operation unit 9, a core unit 10 and the like.

The facsimile unit 4 receives compressed image data through a telephone line, decompresses the received data, and transfers the decompressed image data to the core unit 10. Conversely, the facsimile unit 4 compresses the image data transferred from the core unit 10, and transmits the compressed data through the telephone line. The image data received or to be transmitted can be temporarily stored in an HD (hard disk) 6 connected to the storage unit 5.

Since the storage unit 5 is connected with the HD 6, the storage unit 5 compresses the image data transferred from the core unit 10 and then stores the compressed data into the HD 6 together with an ID (identification) number used to search the stored data. Further, the storage unit 5 searches the compressed image data stored in the HD 6, on the basis of code data transferred through the core unit 10. Then the storage unit 5 reads the searched image data, decompresses the read data, and transfers the decompressed data to the core unit 10. Since the HD 6 has a storage capacity of, e.g., 2 gigabytes, A4-size images corresponding to about 1000 pages can be stored in the HD 6 though it depends on their contents.

Further, the storage unit 5 detects whether or not the HD 6 is connected thereto and whether or not the HD 6 is out of order, by writing, reading and checking command/response and predetermined data through a hard disk interface.

The computer I/F unit 7 interfaces the core unit 10 with a PC/WS (personal computer or work station) 11. The I/F unit 7 may be connected to the PC/WS 11 by a one-to-one local interface or may be connected thereto by a network.

The RIP unit 8 expands or decompresses code data (PDL (page description language)) representing an image transferred from the PC/WS 11 into the image data recordable by the printer unit 2.

The operation unit 9 includes a touch panel display and hard keys. The operation unit 9 is used to instruct and/or set various operations of the image input/output control apparatus through user interface.

Although the details of the core unit 10 will be described later, the core unit 10 controls data flows among the reader unit 1, the printer unit 2, the facsimile unit 4, the storage unit 5, the computer I/F unit 7, the RIP unit 8 and the operation unit 9.

Figure 2:
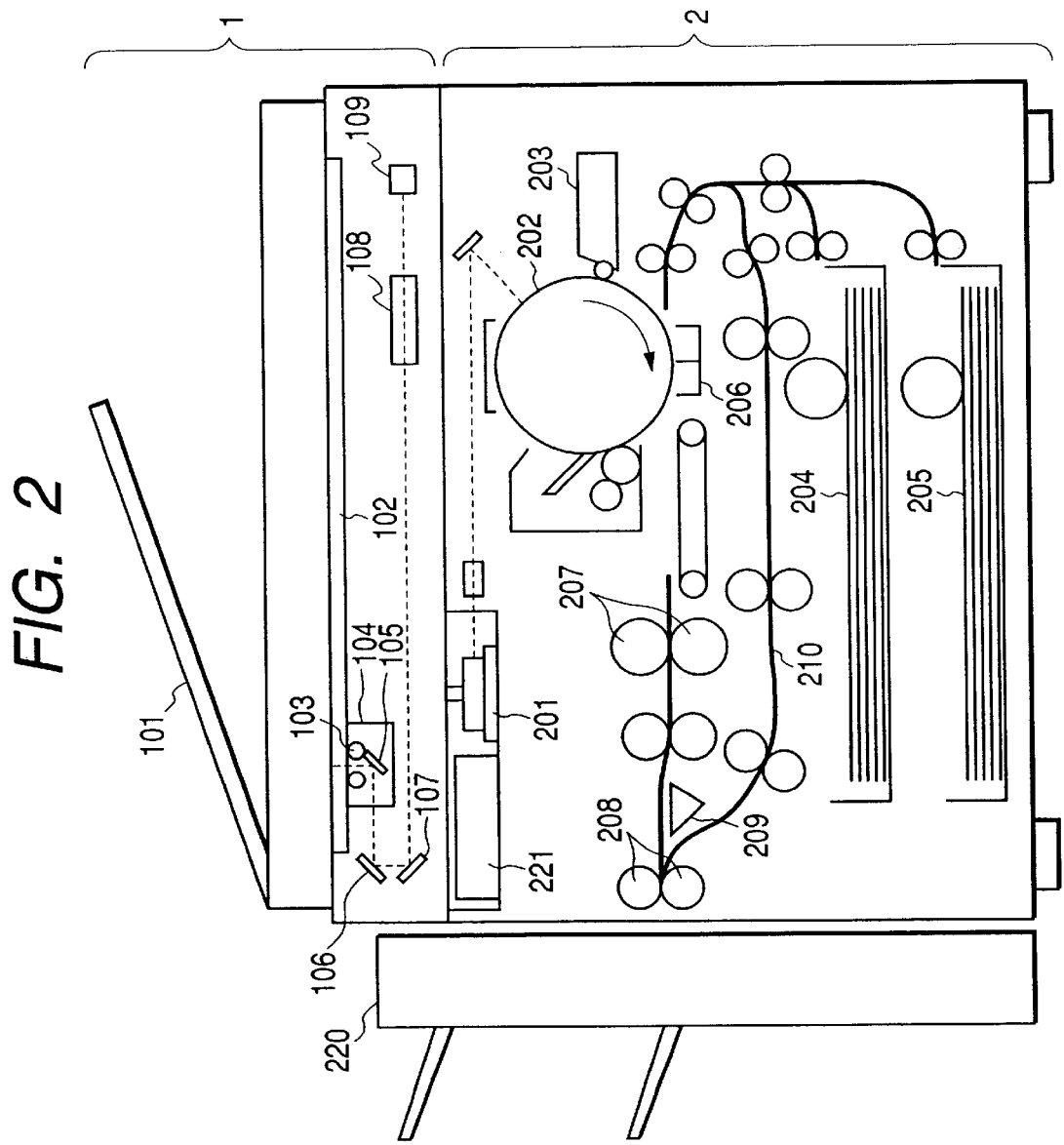
FIG. 2 is a sectional view showing a reader unit and a printer unit.

FIG. 2 is a sectional view showing the reader unit 1 and the printer unit 2. Plural originals are set by a user at a predetermined stacking position of an original feed unit 101 of the reader unit 1. The feed unit 101 feeds these original one by one from their first page in due order, to a platen glass 102. After an original reading operation ends, the feed unit 101 discharges the original on the platen glass 102 to a predetermined discharge position. When the original is fed onto the platen glass 102, a lamp 103 is lit, and movement of a scanner unit 104 is started, whereby the original is exposed and scanned. Reflection light from the original at this time is guided into a CCD image sensor (simply referred as CCD hereinafter) 109 through mirrors 105 to 107 and a lens 108. Thus, the image of the scanned original is photo-electrically converted and read by the CCD 109. Image data output from the CCD 109 is subjected to predetermined processing such as A/D (analog-to-digital) conversion, shading correction, desired complication processing and the like, and then the processed image data is transferred to the core unit 10 of the image input/output control unit 3.

A laser driver 221 of the printer unit 2 causes a laser beam generation unit 201 to generate a laser beam according to the image data output from the core unit 10 of the image input/output control unit 3. The generate laser beam is irradiated onto a photosensitive drum 202, and a latent image according to the laser beam is formed on the drum 202. Then a developer is adhered by a development unit 203 to the latent image portion of the photosensitive drum 202.

A recording sheet is fed from either a cassette 204 or a cassette 205 and carried to a transfer unit 206 at timing which is synchronous with start of the laser beam irradiation. Thus, the developer adhered on the photosensitive drum 202 is transferred onto the recording sheet. T he recording sheet onto which the developer was transferred is carried to a fixing unit 207, and the developer is heated and pressed by the fixing unit 207, whereby the developer is fixed to the recording sheet. The recording sheet passed the fixing unit 207 is discharged to a finisher 220 by discharge rollers 208. The finisher 220 sorts the plural discharged recording sheets by sheafing them, and staples the sorted sheets together. If two-face recording has been set, after the recording sheet subjected to one-face recording is carried up to t he discharge rollers 208, a rotational direction of each roller 208 is reversed, and thus the sheet is guided to a sheet refeed carrying path 210 by a flapper 209. The recording sheet guided to the path 210 is again fed to 20 the transfer unit 206 at the above-described timing, whereby image recording on the other face is performed.

Figure 3:
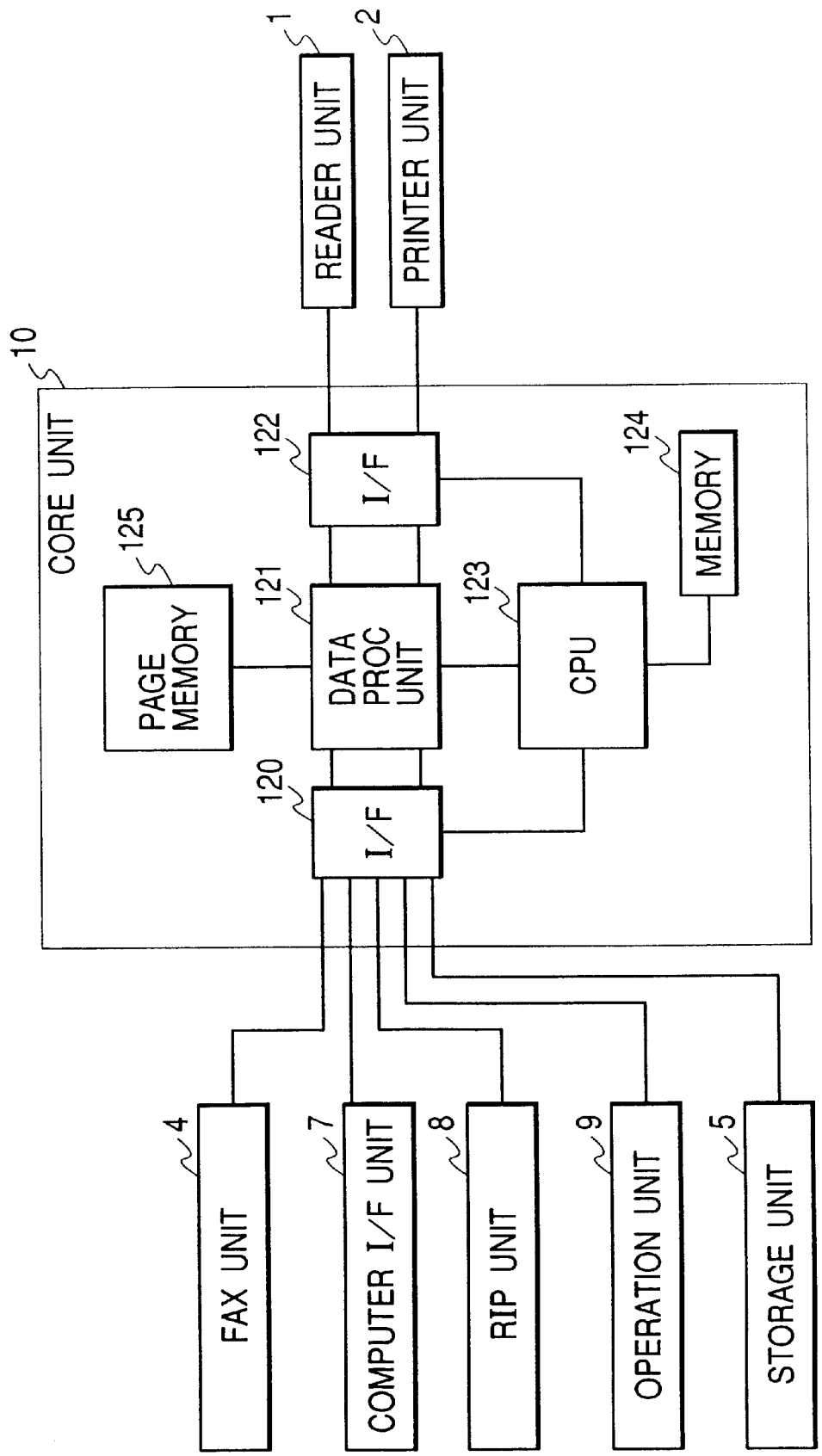
FIG. 3 is a block diagram showing a core unit.

FIG. 3 is a block diagram showing the core unit 10.

The image data from the reader unit 1 is transferr ed to a data processing unit 121 through an I/F (interface) 122. The processing unit 121 which performs image processing (e.g., image rotation processing, magnification change processing) and compression/decompression of the image data has a page memory 125 capable of storing image data (corresponding to A4/letter size) of 4 pages. The image data transferred from the reader unit 1 to the data processing unit 121 is temporarily stored in the page memory 125, and then compressed and transferred to the storage unit 5 through an I/F 120.

The code data (PDL) representing the image input through the computer I/F unit 7 is transferred to the data processing unit 121 through the I/F 120, and further transferred to the RIP unit 8 to be expanded into the image data. The obtained image data is transferred to the processing unit 121, temporarily stored into the page memory 125, and then compressed and transferred to the storage unit 5.

The image data from the facsimile unit 4 is transferred to the data processing unit 121, temporarily stored into the page memory 125, and then compressed and transferred to the storage unit 5.

After the image data from the storage unit 5 is transferred to the data processing unit 121, the image data is decompressed and temporarily stored into the page memory 125. Then the image data is transferred to the printer unit 2, the facsimile unit 4 and/or the computer I/F unit 7.

After various image data is input to the data processing unit 121 and temporarily stored in the page memory 25, it is possible by changing an internal selector to transfer the stored image data to the printer unit 2, the facsimile unit 4 and/or the computer I/F unit 7 before the stored data is transferred to the storage unit 5.

A CPU (central processing unit) 123 controls the above-described various operations in accordance with control programs stored in a memory 124 and control commands transferred from the operation unit 9. Also, the memory 124 is used as an working area of the CPU 123.

Thus, around the core unit 10, it is possible through the data processing unit 121 and the storage unit 5 to perform the processing in which various functions as to original image reading, image printing, image transmission, image reception, image storage, data input/output from/to a computer and the like are combined with others.

Next, job control performed by the CPU 123 of the core unit 10 in the image input/output control apparatus will be explained with reference to FIG. 4. First, a case where the HD 6 normally operates will be explained by way of example. Incidentally, FIG. 4 logically shows the unit of the job control.

The unit of the job control corresponds to a series of input and output processing for a group of the image data including the plural pages. Roughly, an image input job and an image output job are the jobs to be controlled by the job control of one unit.

The image input job includes an image input job 411 to sequentially record the image data read by the reader unit 1 into the storage unit 5, an image input job 412 to sequentially record the image data expanded or decompressed by the RIP unit 8 into the storage unit 5, an image input job 413 to sequentially record the image data received by a facsimile unit 4-1 into the storage unit 5, and an image input job 414 to sequentially record the image data input from a computer I/F unit 7-1 into the storage unit 5.

The image output job includes an image output job 401 to sequentially output the image data read from the storage unit 5 to the printer unit 2, an image output job 403 to sequentially output the image data read from the storage unit 5 to a facsimile unit 4-2, and an image output job 404 to sequentially output the image data read from the storage unit 5 to a computer I/F unit 7-2.

Figure 5:
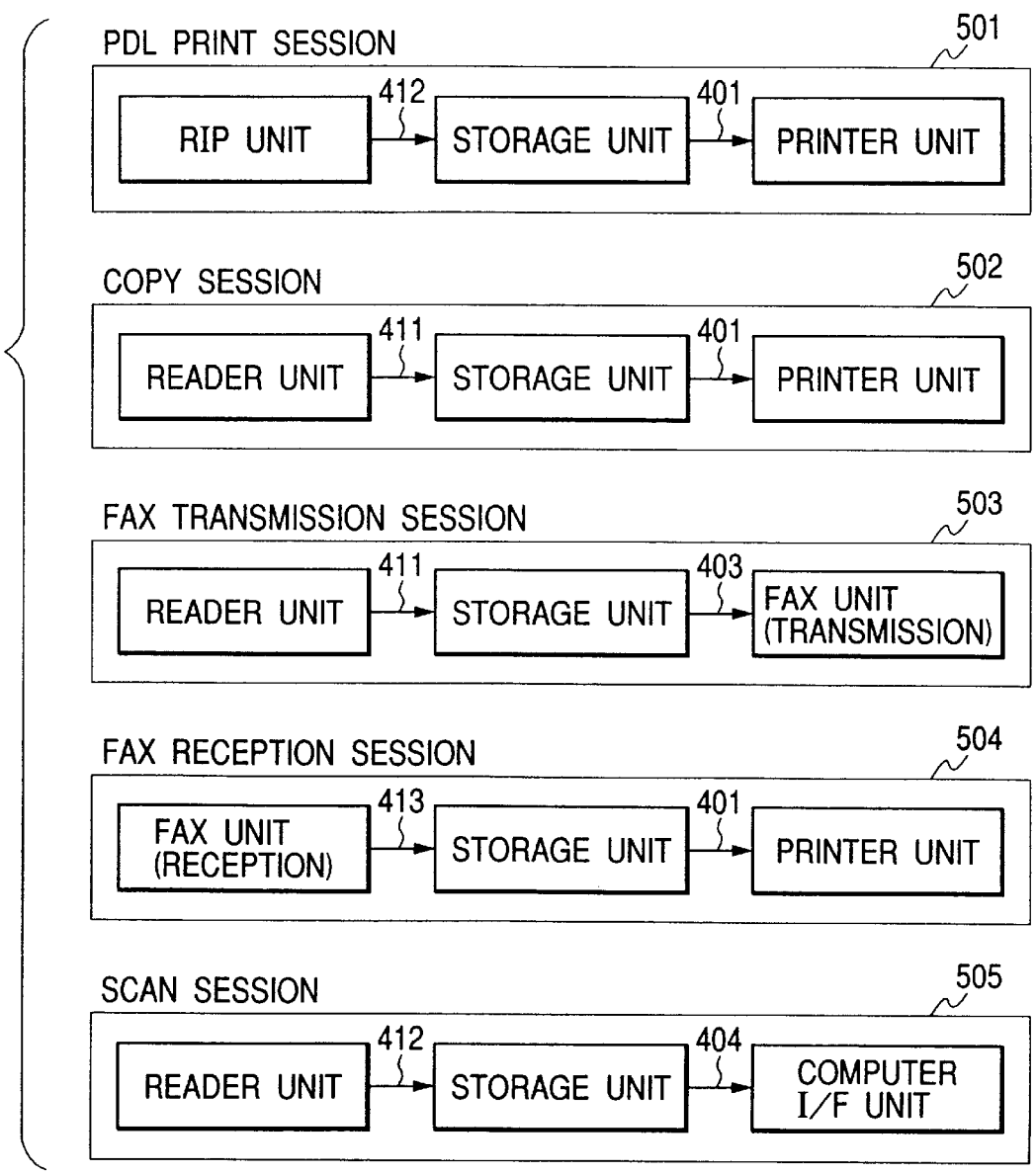
FIG. 5 is a view showing a structural example of sessions.

FIG. 5 shows an example of the unit (referred as session hereinafter) which is given by combining the plural jobs with others.

In FIG. 5, numeral 501 denotes a PDL print session in which the image input job 412 and the image output job 401 are combined with each other and controlled as the session. Numeral 502 denotes a copy session in which the image input job 411 and the image output job 401 are combined with each other and controlled as the session. Numeral 503 denotes a facsimile transmission session in which the image input job 411 and the image output job 403 are combined with each other and controlled as the session. Numeral 504 denotes a facsimile reception session in which the image input job 413 and the image output job 401 are combined with each other and controlled as the session. Numeral 505 denotes a scan session in which the image input job 411 and the image output job 404 are combined with each other and controlled as the session.

The session represents the control unit which includes one or more job. Therefore, in addition to the example shown in FIG. 5, for example, the image input job 412 may be handled as one session, the image output job 401 may be handled as one session, or the combination of the image input job 412 and the image output jobs 401 and 403 may be handled as one session.

FIGS. 6A to 6C are flow charts showing procedures of session control and job control tasks to be executed by the CPU 123 in the core unit 10 of the image input/output control apparatus when the HD 6 normally operates. In this case, the session includes the image input job to sequentially record the image data into the storage unit 5, and the image output job to sequentially output the image data recorded in the storage unit 5 to the printer unit 2. In the drawing, numerals S601 to S609, S611 to S617 and S621 to S630 respectively denote steps. Further, a session control task (a), an image input job control task (b) and an image output job control task (c) are in multitasking relation.

As a first example of the session control and the job control of the image input/output control apparatus according to the embodiment, the control procedures of the PDL print session 501 and the image input and output jobs 412 and 401 which together constitute the PDL print session 501 will be explained with reference to FIGS. 6A to 6C.

First, in the step S601 of the session control task (a), the user performs the print setting on the PC/WS 11. The contents to be set are the number of pages, the number of prints, an original size, a sheet size, a magnification/reduction rate, one-face/two-face printing, a layout, page output order, a sort mode, stapling and the like. In this case, it is assumed that following parameters have been set in an example.

the number of pages: 20 pages (P1)

the number of prints: 10 prints (P2)

one-face printing: yes (P3)

original size: A4 (P4)

sheet size: A4 (P5)

magnification/reduction rate: 100% (P6)

layout: no (P7)

page output order: ascending order (P8)

sort mode: yes (P9)

stapling: yes . (P10)

After the above-described print setting, the user issues a print instruction on the PC/WS 11. Simultaneously, target document data is converted into so-called PDL data by driver software installed in the PC/WS 11. Then the obtained PDL data, together with the print setting parameters (P1) to (P10), is transferred to the computer I/F unit 7 of the image input/output control apparatus through a computer interface connected to the PC/WS 11.

After the PDL data representing the image input through the computer I/F unit 7 is transferred to the data processing unit 121, the PDL data is transferred to the RIP unit 8 and expanded (or rasterized) into the image data. When the RIP unit 8 starts to receive the PDL data, the RIP unit 8 issues a processing request to the core unit 10, and the CPU 123 of the core unit 10 receives the issued processing request. In this case, the print setting parameters (P1) to (P10) set by the user are also transferred to the CPU 123.

Figure 7:
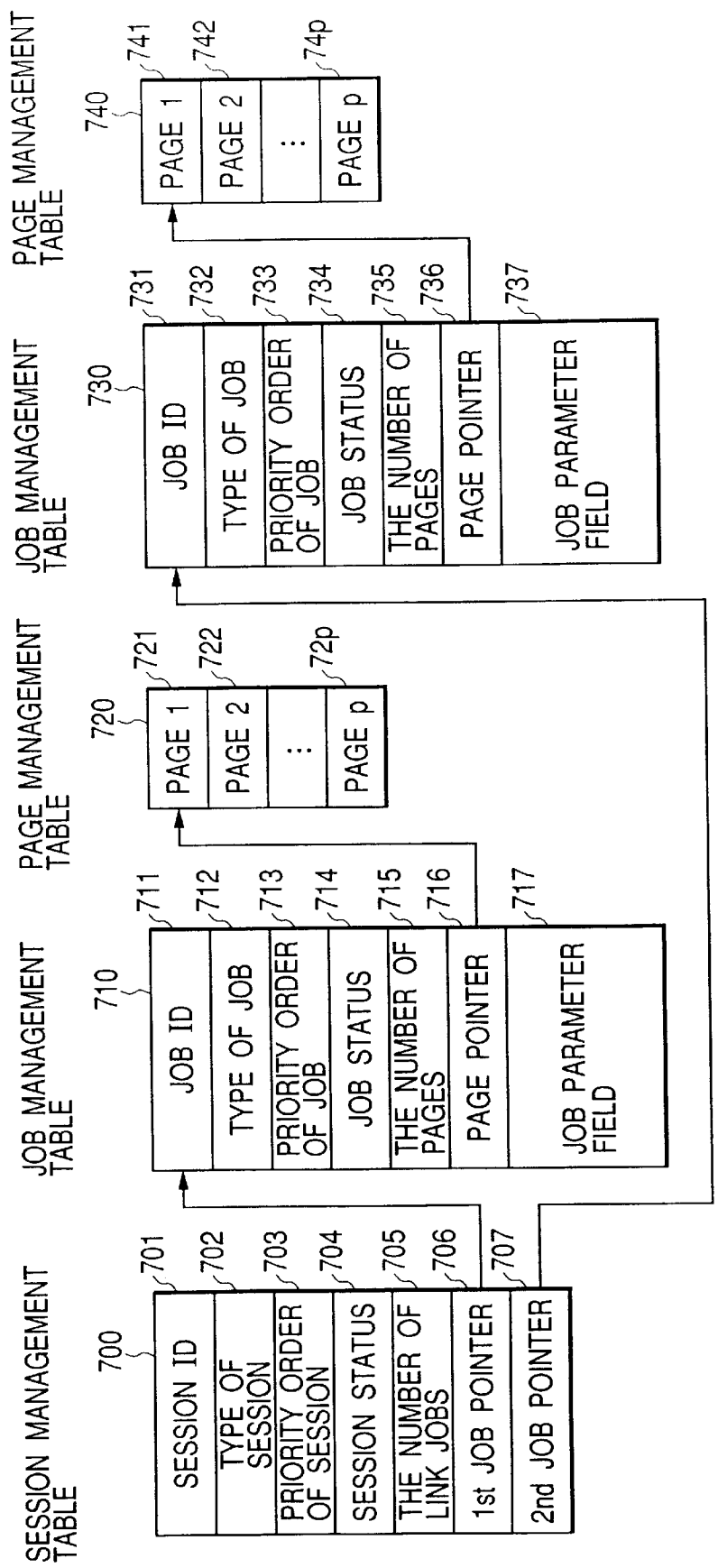
FIG. 7 is a view showing structures of a session management table, a job management table and a page management table according to the embodiment.

In the step S602, the core unit 10 divides an image processing function of one unit according to the processing request from the RIP unit 8 into at least one image input job or one image output job. Then, in the core unit 10, the session constituted by the image input job or the image output job is generated and managed. FIG. 7 shows a session management table 700. When the session is generated, the session management table 700 of FIG. 7 is formed on the memory 124 to hold various information until the session ends.

A session ID field 701 is to generate a unique session ID in the image input/output control apparatus and hold it. A session type field 702 is to specify a type of the generated session (PDL print session, copy session, facsimile transmission session, facsimile reception session, scan session, or the like). In the embodiment, the field 702 specifies and records the PDL print session. A session priority order field 703 is to hold priority of processing order of the session. A session status field 704 is to hold an execution state of the session (executable state, execution state, interruption state, end state, error state, or the like) according to the state. A link job number field 705 is to hold the number of the image input jobs and the image output jobs which together constitute the session. In the embodiment, since the PDL print session 501 is constituted by the two jobs, i.e., the image input job 412 and the image output job 401, as shown in FIG. 5, the number "2" is set to the link job number field 705. A first job pointer field 706 is the pointer for a job management table 710 of the image input job 412. A second job pointer field 707 is the pointer for a job management table 730 of the image output job 401. There are prepared the job pointer fields of which number corresponds to the number of jobs which together constitute the session. Also, there are prepared the job management tables of which number corresponds to the number of jobs which together constitute the session.

In the step S603, the job management table 710 of the image input job 412 shown in FIG. 7 is formed on the memory 124 to hold various information until the job ends.

A job ID field 711 is to generate a unique job ID in the image input/output control apparatus and hold it. A job type field 712 is to specify a type of the generated job (above-described image input job and image output job). In the embodiment, the job type field 712 specifies and records the image input job 412 which is to sequentially record the image data expanded or decompressed by the RIP unit 8 into the storage unit 5. A job priority order field 713 is to hold priority of job processing order. A job status field 714 is to hold an execution state of the job (executable state, execution state, interruption state, end state, error state, or the like) according to the state. A page number field 715 is to hold the number of pages of the job. A page pointer field 716 is the pointer for a page management table 720 in which detailed information of each page managed by the job has been written. The page management table 720 is recorded on the ID 6.

A job parameter field 717 is to hold various setting parameters of the job. In the embodiment, the contents of the print setting parameters (P1) to (P10) set in the step S601 are held.

After the job management table 710 of the above-described image input job is formed, the session control task (a) starts the image input job control task (b).

In the step S604, the job management table 730 of the image output job 401 shown in FIG. 7 is formed on the memory 124 to hold various information until the job ends.

A job ID field 731 is to generate a unique job ID in the image input/output control apparatus and hold it. A job type field 732 is to specify a type of the generated job (above-described image input job and image output job). In the embodiment, the job type field 732 specifies and records the image output job 401 which is to sequentially output the image data stored in the storage unit 5 to the printer unit 2. A job priority order field 733 is to hold priority of job processing order. A job status field 734 is to hold all execution state of the job (executable state, execution state, interruption state, end state, error state, or the like) according to the state. A page number field 735 is to hold the number of pages of the job. A page pointer field 736 is the pointer for a page management table 740 in which detailed information of each page managed by the job has been written. The entity (or substance) of the page management table 740 is identical with that of the page management table 720 recorded on the HD 6 with respect to the image input job 412.

A job parameter field 737 is to hold various setting parameters of the job. In the embodiment, the contents of the parameters (P1) to (P10) which respectively concern the number of pages, the number of prints, the sheet size, the magnification/reduction rate, the one-face/two-face printing, the page output order, the sort output, the stapling and the like and were set in the step S601 are held.

After the job management table 730 of the above-described image output job is formed, the session control task (a) starts the image output job control task (c).

In the step S605, processing of the generated image input job 412 starts. That is, the session control task (a) instructs the image input job control task (b) to start the job.

In the step S606, processing of the generated image output job 401 starts. That is, the session control task (a) instructs the image output job control task (c) to start the job.

In the step S607, the session control task (a) receives a job end notification from the image input job control task (b) and performs end processing of the image input job. Namely, the job status (field) 714 of the job management table 710 of the image input job ends.

In the step S608, the session control task (a) receives a job end notification from the image output job control task (c) and performs end processing of the image output job. Namely, the job status (field) 734 of the job management table 730 of the image output job ends.

In the step S609, end processing of the session is performed. Namely, the job management table 710 of the image input job, the job management table 730 of the image output job, and the image data for each page in the page management tables 720 and 740 are discarded, and thus resources are released. Also, the session management table 700 is discarded, and thus resources are released. Thus a series of processing ends.

Next, the image input job control task (b) in the PDL print session 501 will be explained.

In the step S611, the image input job control task (b) receives the job start instruction from the session control task (a). Then, if the image input job control task (b) does not execute another image input job and can receive a new image input job, the task (b) starts the instructed job.

In the step S612, the image data of one page expanded by the RIP unit 8 is received. Namely, the image is transferred from the RIP unit 8 to the data processing unit 121 through the I/F 120.

In the step S613, the image data transferred to the data processing unit 121 is temporarily stored in the page memory 125. It is also called that the transferred image data is primarily stored in the memory 125.

In the step S614, the image input job control task (b) transmits a page output request to the image output job control task (c). If reading of the image data of the corresponding page from the page memory 125 ends in the later-described image output job control task (c), the flow advances to the step S615.

In the step S615, the image data temporarily stored in the page memory 125 is recorded into the hard disk of the storage unit 5. This operation is also called as secondary storage. At this time, various image attribute information (resolution, the number of pixels and the like) is recorded at a page 1 field 721. in the page management table 720.

In the step S616, it is judged whether or not all the pages expanded in the RIP unit 8 and to be processed have been recorded as image data into the HD 6. If the page not processed remains, the flow returns to the step S612. Conversely, if all the pages were processed, the flow advances to the step S617.

In the step S617, the image input job control task (b) transmits the image input job end notification to the session control task (a), and the task (b) ends. Thus, the job status (field) 714 in the job management table 710 of the image input job ends.

Next, the image output job control task (c) in the PDL print session 501 will be explained.

In the step S621, the image output job control task (c) receives the job start instruction from the session control task (a). If the printer unit 2 is not used by another job and can perform a new printing operation, the task (c) starts the instructed job.

In the step S622, the output request of the image data temporarily stored in the page memory 125 is received from the image input job control task (b).

In the step S623, the image data reading from the page memory 125 starts.

In the step S624, after the use right (or usufruct) of the printer unit 2 is acquired, the image data of the read page is transferred to the printer unit 2 through the I/F 122. Thus, as described above, the printer unit 2 performs image formation and prints out the formed image.

In the step S625, it is judged whether or not the page output request from the image input job control task (b) corresponds to the final page. As a result, if the page not yet processed remains, the flow returns to the step S622. Conversely, if all the pages were processed, the flow advances to the step S626. By the processing up to this time, first one of 10 prints set at the parameter (P2) ends. At this time, stapling process may be performed to the printed output if necessary.

In the step S626, the image data for each page which was stored into the HD 6 of the storage unit 5 in the step S615 of the image input job control task (b) is sequentially read and transferred to the image processing unit 121 through the I/F 120. In the image processing unit 121, the transferred image data of one page is held in the page memory 125.

In the step S627, after the use right (or usufruct) of the printer unit 2 is acquired, the image data transferred to the data processing unit 121 and held in the page memory 125 is transferred to the printer unit 2 through the I/F 122. Thus, the printer unit 2 performs the image formation and prints out the formed image.

In the step S628, it is judged whether or not the image data of each page stored in the HD 6 was completely printed out. As a result, if the page not yet processed remains, the flow returns to the step S626. Conversely, if all the pages were processed, since the stapling has been instructed, the sheets of the first print are stapled by the printer unit 2, and the flow advances to the step S629.

In the step S629, it is judged whether or not all the prints of which number was set in the step S601 are output. As a result, if the print not yet processed remains, the flow returns to the step S626 to read the image from the HD 6, store the read image data into the page memory 125 and then print out the image data with the printer unit 2. Conversely, if all the prints were processed, the flow advances to the step S630.

In the step S630, the image output job control task (c) notifies image output job end notification to the session control task (a), and the image output job control task (c) ends. Thus, the job status (field) 734 of the job management table 730 of the image output job ends.

In the above-described example, it is explained the PDL print session 501 of FIG. 5 in which, according to the print setting by the PC/WS 11, the image information is transferred as the PDL data from the PC/WS 11, the PDL data is expanded into the image data by the image input/output control apparatus, and the obtained image data is print output. However, the above-described processing is also applicable to the copy session 502 of FIG. 5 in which the image information read by the reader unit 1 is print output.

Hereinafter, a second example of the session control and the job control of the image input/output control apparatus in the case where the HD 6 normally operates will be explained with reference to FIGS. 6A to 6C. In the second example, the control procedures of the copy session 502 of FIG. 5, and the image input and output jobs 411 and 401 which together constitute the session 502 will be explained. In this case, the image input job 411 is to sequentially record the image data read by the reader unit 1 into the storage unit 5, and the image output job 401 is to sequentially output the image data read from the storage unit 5 to the printer unit 2.

First, in the step S601, the user performs various print setting on the operation unit 9 of the image input/output control unit 3.

Figure 8:
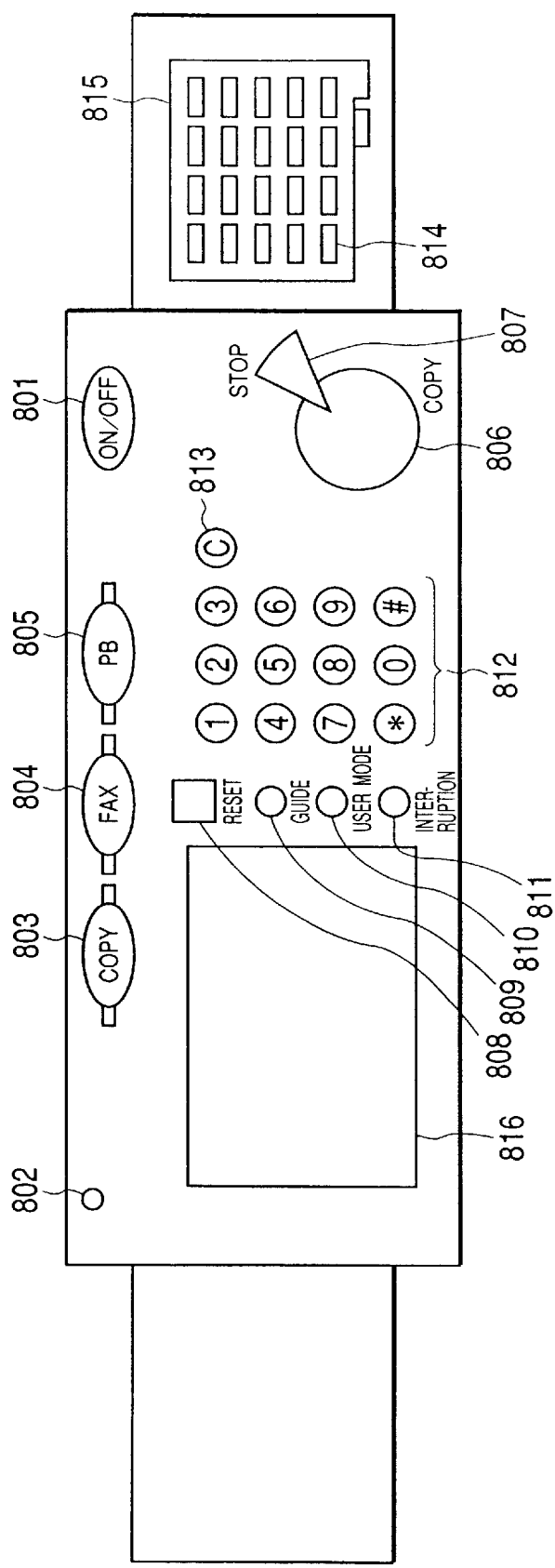
FIG. 8 is a view showing an operation unit.

FIG. 8 shows the appearance of the operation unit 9. In the drawing, numeral 801 denotes a power supply key, numeral 802 denotes a preheating key, numeral 803 denotes a copy function selection key, numeral 804 denotes a facsimile function selection key, numeral 805 denotes a personal box function selection key, numeral 806 denotes a start key, numeral 807 denotes a stop key, numeral 808 denotes a reset key, numeral 809 denotes an operation guidance key, numeral 810 denotes a user mode setting key, numeral 811 denotes an interruption copy key, numeral 812 denotes numeric keys, numeral 813 denotes a clear key, numeral 814 denotes a facsimile one-touch key, numeral 815 denotes a one-touch key changeable template, and numeral 816 denotes a touch panel. The setting contents for the copy operation are the number of copies, a sheet size, a magnification/reduction rate, one-face/two-face copy, a sort output mode, stapling and the like. The user inputs such parameters by using the numeric keys 812 and the setting items displayed on the touch panel 816. In this case, it is assumed that following parameters have been set in an example.

the number of copies: 10 copies (C1)

one-face copy: yes (C2)

sheet size: A4 (C3)

magnification/reduction rate: 100% (C4)

layout: no (C5)

sort mode: yes (C6)

stapling: yes (C7)

After the above-described copy setting, the user puts the original on the reader unit 1 and depresses the start key 806 to issue a copy instruction. The operation unit 9 transfers the set parameters (C1) to (C7) to the CPU 123 of the core unit 10 to issue a processing request.

In the step S602, the core unit 10 divides an image processing function of one unit according to the processing request from the operation unit 9 into at least one image input job or one image output job. Then, in the core unit 10, the session constituted by the image input job or the image output job is generated and managed on the session management table 700 shown in FIG. 7. The session management table 700 holds various information until the session ends.

The session ID field 701 generates a unique session ID in the image input/output control apparatus and hold it. The session type field 702 is to specify a type of the generated session (PDL print session, copy session, facsimile transmission session, facsimile reception session, scan session, or the like). In the embodiment, the field 702 specifies and records the PDL print session. The session priority order field 703 holds priority of processing order of the session. The session status field 704 holds an execution state of the session (executable state, execution state, interruption state, end state, error state, or the like). The link job number field 705 holds the number of the image input jobs and the image output jobs which together constitute the session. In the embodiment, since the copy session 502 is constituted by the two jobs, i.e., the image input job 411 and the image output job 401, as shown in FIG. 5, the number "2" is set to the link job number field 705. The first job pointer field 706 is the pointer for the job management table 710 of the image input job 411. The second job pointer field 707 is the pointer for the job management table 730 of the image output job 401.

In the step S603, the job management table 710 of the image input job 411 is formed on the memory 124 to hold various information until the job ends.

The job ID field 711 is to generate a unique job ID in the image input/output control apparatus and hold it. The job type field 712 is to specify a type of the generated job (above-described image input job and image output job). In the embodiment, the job type field 712 specifies and records the image input job 411 which is to sequentially record the image data read by the reader unit 1 into the storage unit 5. The job priority order field 713 is to hold priority of job processing order. The job status field 714 is to hold an execution state of the job (executable state, execution state, interruption state, end state, error state, or the like) according to the state. The page number field 715 is to hold the number of pages of the job. The page pointer field 716 is the pointer for the page management table 720 in which detailed information of each page managed by the job has been written. The page management table 720 is recorded on the HD 6.

The job parameter field 717 is to hold various setting parameters of the job. In the embodiment, the contents of the copy setting parameters (C1) to (C7) set in the step S601 are held.

After the job management table 710 of the image input job is formed, the session control task (a) starts the image input job control task (b).

In the step S604, the job management table 730 of the image output job 401 is formed on the memory 124 to hold various information until the job ends.

The job ID field 731 is to generate a unique job ID in the image input/output control apparatus and hold it. The job type field 732 is to specify a type of the generated job (above-described image input job and image output job). In the embodiment, the job type field 732 specifies and records the image output job 401 which is to sequentially output the image data stored in the storage unit 5 to the printer unit 2. The job priority order field 733 is to hold priority of processing order of the job. The job status field 734 is to hold an execution state of the job (executable state, execution state, interruption state, end state, error state, or the like) according to the state. The page number field 735 is to hold the number of pages of the job. The page pointer field 736 is the pointer for the page management table 740 in which detailed information of each page managed by the job has been written. The entity of the page management table 740 is identical with that of the page management table 720 recorded on the HD 6 with respect to the image input job 411.

The job parameter field 737 is to hold various setting parameters of the job. In the embodiment, the contents of the parameters (C1) to (C7) which respectively concern the number of copies, the sheet size, the magnification/reduction rate, the one-face/two-face copy, the sort output, the stapling and the like and were set in the step S601 are held.

After the job management table 730 of the image output job is formed, the session control task (a) starts the image output job control task (c).

In the step S605, processing of the generated image input job 411 starts. That is, the session control task (a) instructs the image input job control task (b) to start the job.

In the step S606, processing of the generated image output job 401 starts. That is, the session control task (a) instructs the image output job control task (c) to start the job.

In the step S607, the session control task (a) receives a job end notification from the image input job control task (b) and performs the end processing of the image input job. Namely, the job status (field) 714 of the job management table 710 of the image input job ends.

In the step S608, the session control task (a) receives a job end notification from the image output job control task (c) and performs the end processing of the image output job. Namely, the job status (field) 734 of the job management table 730 of the image output job ends.

In the step S609, the end processing of the session is performed. Namely, the job management table 710 of the image input job, the job management table 730 of the image output job, and the image data for each page in the page management tables 720 and 740 are discarded, and thus the resources are released. Also, the session management table 700 is discarded, and thus the resources are released. Thus a series of processing ends.

Next, the image input job control task (b) in the copy session 502 will be explained.

In the step S611, the image input job control task (b) receives the job start instruction from the session control task (a). Then, if the reader unit 1 is not used by another image input job and a new image input job is acceptable, the task (b) starts the instructed job.

In the step S612, the image data of one page read by the reader unit 1 is received. Namely, the image is transferred from the reader unit 1 to the data processing unit 121 through the I/F 120.

In the step S613, the image data transferred to the data processing unit 121 is temporarily stored in the page memory 125. It is also called that the transferred image data is primarily stored in the memory 125.

In the step S614, the image input job control task (b) transmits a page output request to the image output job control task (c). If reading of the image data of the corresponding page from the page memory 125 ends in the image output job control task (c), the flow advances to the step S615.

In the step S615, the image data temporarily stored in the page memory 125 is recorded into the HD 6 of the storage unit 5. This operation is also called as secondary storage. At this time, various image attribute information (resolution, the number of pixels and the like) is recorded at a page 1 field 721 in the page management table 720.

In the step S616, it is judged whether or not all the pages read by the reader unit 1 and to be processed have been recorded as image data into the HD 6. If the page not processed remains, the flow returns to the step S612. Conversely, if all the pages were processed, the flow advances to the step S617.

In the step S617, the image input job control task (b) transmits the image input job end notification to the session control task (a), and the task (b) ends. Thus, the job status (field) 714 in the job management table 710 of the image input job ends.

Since the processing in the step S621 and the following steps of the image output job control task (c) in the copy session 502 are identical with those in the above-described PDL print session 501, the detailed explanation thereof is omitted.

In the above-described examples, the PDL print session 501 and the copy session 502 are explained. However, as the expanded example in FIG. 5, even if an arbitrary session is constructed by arbitrarily combining the image input job and the image output job with each other, the control procedure in the embodiment is also applicable to such the arbitrary session.

Next, a control operation by the CPU 123 of the core unit 10 in a case where the HD 6 is out of order will be explained.

FIG. 11 is a flow chart showing an operation procedure of the CPU 123 disposed in the core unit 10 for checking whether or not the HD 6 is connected and whether or not the HD 6 is out of order.

First, in a step S1101, a WRITE command for writing specific data (e.g., 55H) into a specific sector is issued to the HD 6.

In a step S1102, the flow is on standby for predetermined time, and then it is judged in a step S1103 whether or not there is a response to the WRITE command from the HD 6. If judged that there is the response, the flow advances to a step S1104. Conversely, if judged that there is no response, the flow advances to a step S1110.

In the step S1104, a READ command for reading data from the sector identical with that into which the predetermined data was written is issued.

In a step S1105, the flow is on standby for predetermined time, and then it is judged in a step S1106 whether or not there is a response to the READ command from the HID 6. If judged that there is the response, the flow advances to a step S1107. Conversely, if judged that there is no response, the flow advances to the step S1110.

In the step S1107, the data written in the step S1101 is collated with the data read in the step S1104. Then if these data are coincident in a step S1108, the flow advances to a step S1109, while if these data are not coincident, the flow advances to the step S1110.

In the step S1109, it is considered that the HD 6 normally operates, and such a result is notified to the CPU 123 of the core unit 10. In the step S1110, it is considered that the HD 6 is out of order, and such a result is notified to the CPU 123. The CPU 123 which received the result holds a message that the HD 6 is out of order in the memory 124.

Next, a control operation by the CPU 123 disposed in the core unit 10 of the image input/output control apparatus according to the embodiment to be performed when the HD 6 is out of order will be explained.

Figure 4:
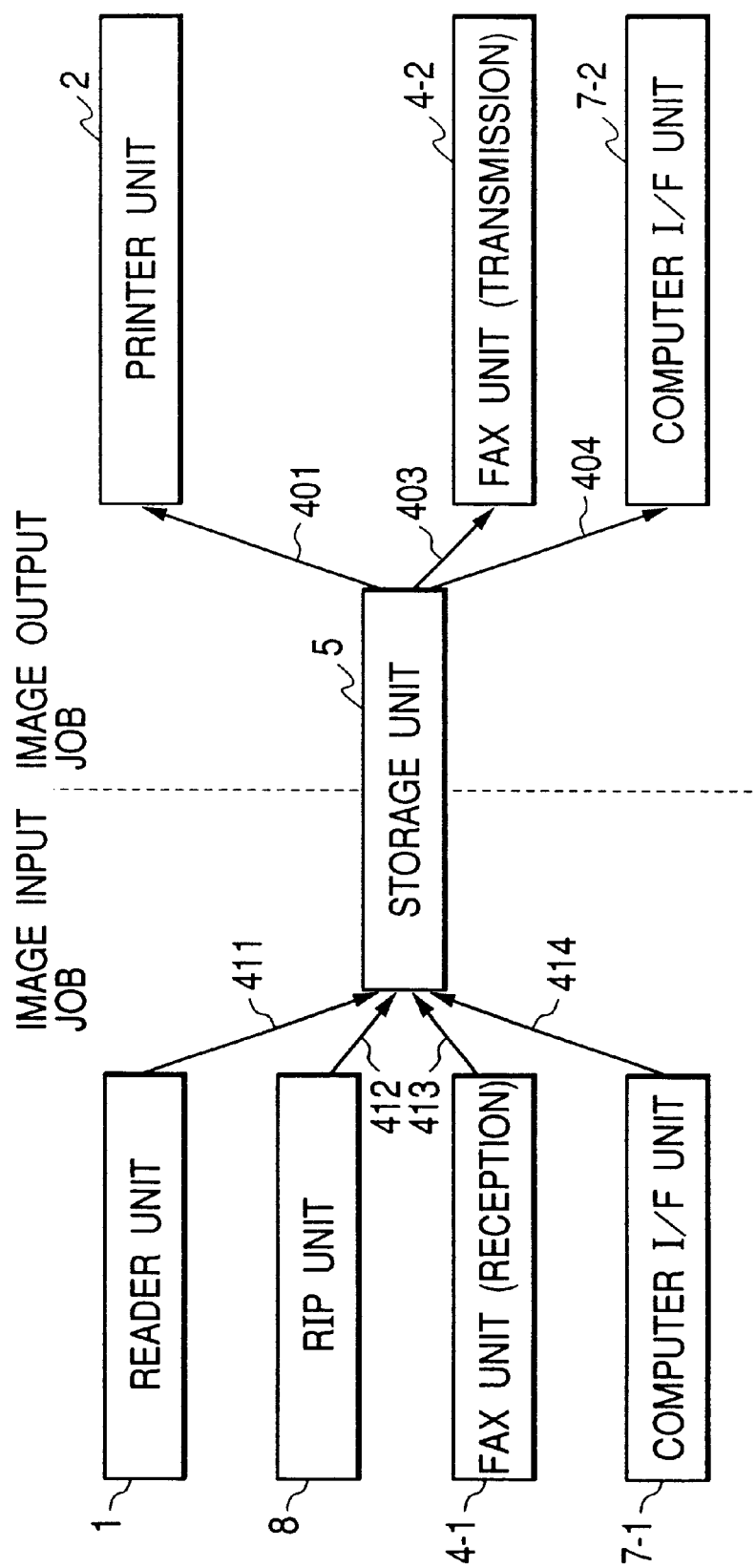
FIG. 4 is a conceptional block diagram showing an image input job and an image output job.

If the HD 6 is out of order, the storage unit shown in FIGS. 4 and 5 is replaced with the page memory 125 of the data processing unit 121, and the processing is performed.

Figure 9B:
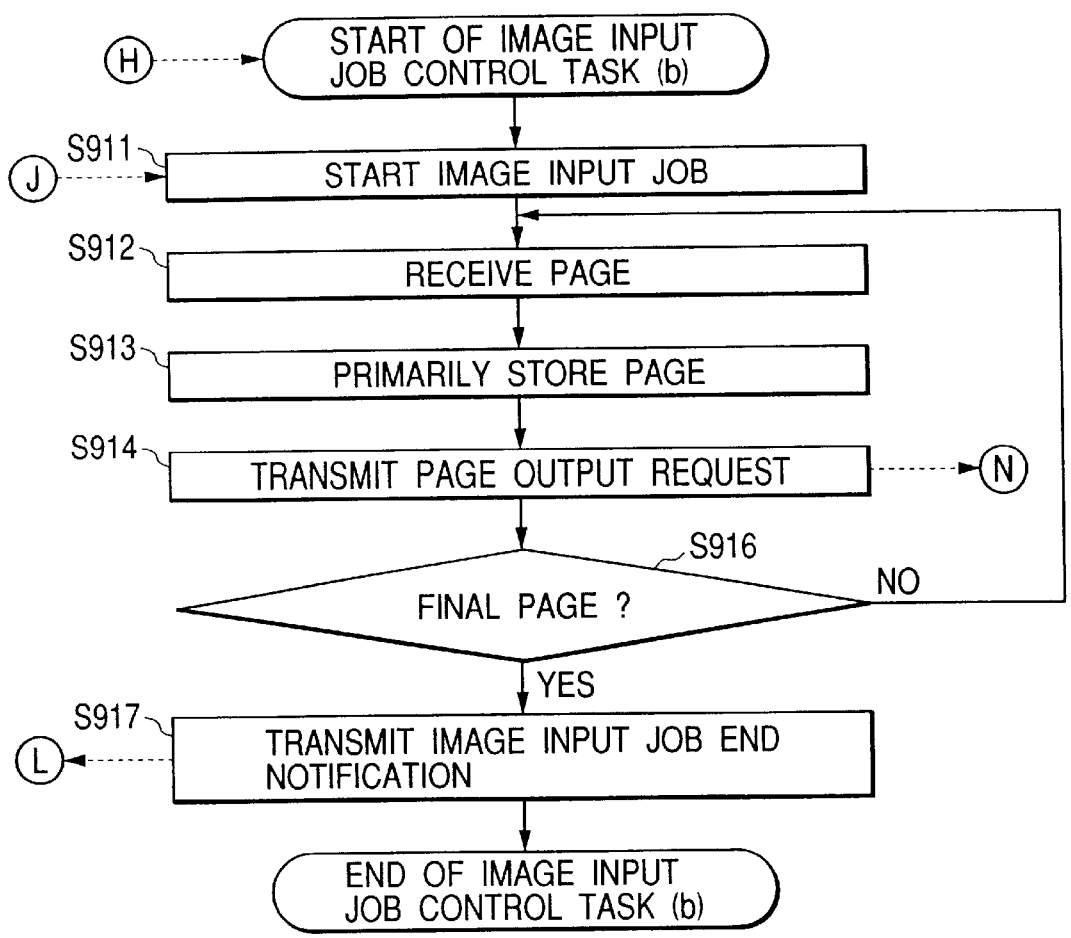
FIG. 9, which is comprised of FIGS. 9A, 9B and 9C, is a flow chart showing an example of the image input/output control.
Figure 9C:
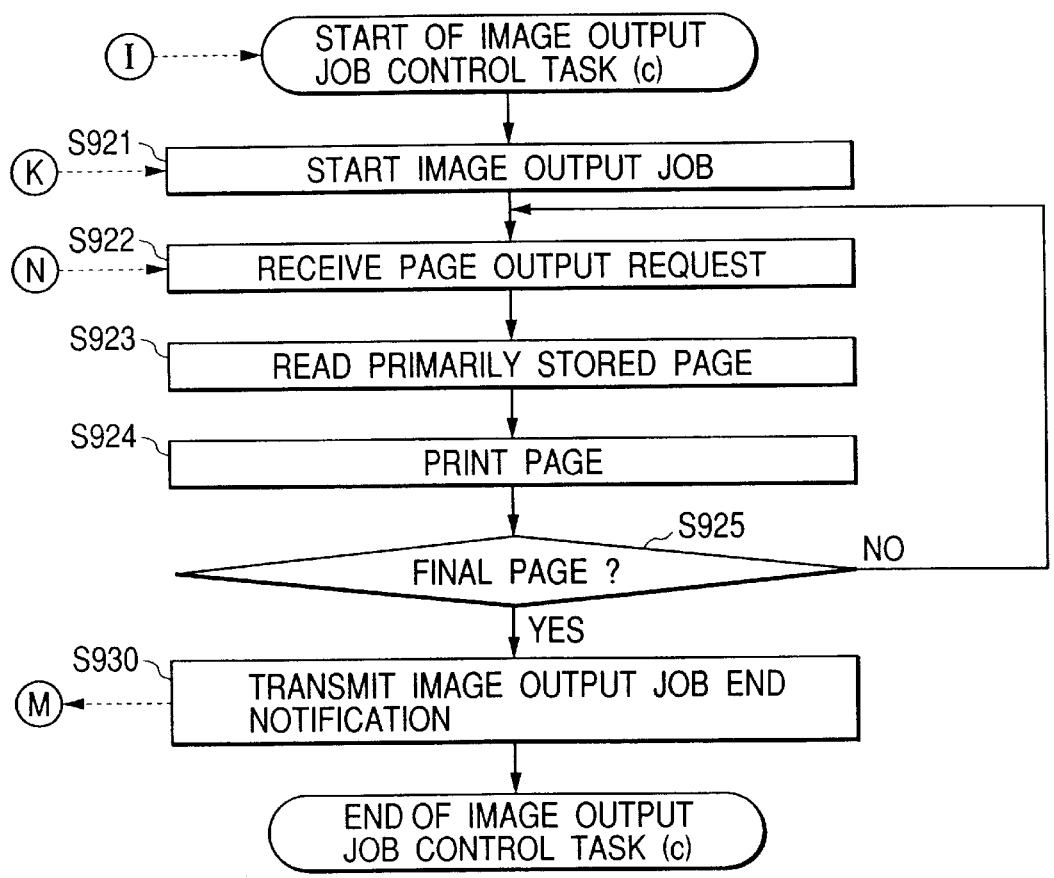

FIGS. 9A to 9C are flow charts showing procedures of session control and job control tasks to be executed by the CPU 123 in the core unit 10 of the image input/output control apparatus. In this case, the session includes the image input job to sequentially record the image data into the page memory 125, and the image output job to sequentially output the image date recorded in the page memory 125 to the printer unit 2 for printout. In the drawing, numerals S901 to S909, S911 to S914, S916, S917, S921 to S925, S930 and S940 respectively denote steps. Further, a session control task (a), an image input job control task (b) and an image output job control task (c) are in multitasking relation.

As an example of the session control and the job control to be performed in the case where the hard disk of the image input/output control apparatus is out of order, the control procedures of the PDL print session 501 and the image input and output jobs 412 and 401 which together constitute the PDL print session 501 will be explained with reference to FIGS. 9A to 9C. In this case, it should be noted that the image input job 412 is to sequentially record the image data expanded or decompressed by the RIP unit 8 into the page memory 125 of the data processing unit 121, and the image output job 401 is to sequentially output the image data recorded in the page memory 125 of the data processing unit 121 to the printer unit 2 for printout.

As described above, it had been detected by the CPU 123 of the core unit 10 that the HD 6 of the storage unit 5 is out of order, and such the detected result has been held in the memory 124.

First, the user performs the print setting on the PC/WS 11. The contents to be set are the number of pages, the number of prints, an original size, a sheet size, a magnification/reduction rate, one-face/two-face printing, a layout, page output order, a sort mode, stapling and the like. In this case, it is assumed that following parameters have been set in an example.

the number of pages: 20 pages (P11)

the number of prints: 10 prints (P12)

one-face printing: yes (P13)

original size: A4 (P14)

sheet size: A4 (P15)

magnification/reduction rate: 100% (P16)

layout: bookbinding (P17)

page output order: ascending order (P18)

sort mode: yes (P19)

stapling: yes (P20)

After the above-described print setting, the user issues a print instruction on the PC/WS 11. Simultaneously, target document data is converted into so-called PDL data by driver software installed in the PC/WS 11. Then the obtained PDL data, together with the print setting parameters (P11) to (P20), is transferred to the computer I/F unit 7 of the image input/output control apparatus through the computer interface connected to the PC/WS 11.

After the PDL data representing the image input through the computer I/F unit 7 is transferred to the data processing unit 121, the PDL data is further transferred to the RIP unit 8 and sequentially expanded (or rasterized) into the image data. When the RIP unit 8 starts to receive the PDL data, the RIP unit 8 issues a processing request to the core unit 10, and the CPU 123 of the core unit 10 receives the issued processing request in the step 901. In this case, the print setting parameters (P11) to (P20) set by the user are also transferred to the CPU 123.

Next, in the step S940, it is judged whether or not the session can be internally generated on the basis of the processing request issued from the RIP unit 8. Namely, if another session is present at this time, the RIP unit 8 notifies that the session can not be generated, and after predetermined time passes, it is structured to again issue the processing request from the RIP unit 8. Conversely, if the PDL print session 501 can be generated, the flow advances to the step S902.

In the step S902, the core unit 10 divides an image processing function of one unit according to the processing request from the RIP unit 8 into at least one image input job or one image output job. Then, in the core unit 10, the session constituted by the image input job or the image output job is generated and managed. Namely, as described above, the session management table 700 of FIG. 7 is formed on the memory 124 to hold various information until the session ends.

The session ID field 701 is to generate a unique session ID in the image input/output control apparatus and hold it. The session type field 702 is to specify a type of the generated session (PDL print session, copy session, facsimile transmission session, facsimile reception session, scan session, or the like). TIn the embodiment, the field 702 specifies and records the PDL print session. The session priority order field 703 is to hold priority of processing order of the session. The session status field 704 is to hold an execution state of the session (executable state, execution state, interruption state, end state, error state, or the like) according to the state. The link job number field 705 is to hold the number of the image input jobs and the image output jobs which together constitute the session. In the embodiment, since the PDL print session 501 is constituted by the two jobs, i.e., the image input job 412 and the image output job 401, as shown in FIG. 5, the number "2" is set to the link job number field 705. The first job pointer field 706 is the pointer for the job management table 710 of the image input job 412. The second job pointer field 707 is the pointer for the job management table 730 of the image output job 401. There are prepared the job pointer fields of which number corresponds to the number of jobs which together constitute the session. Also, there are prepared the job management tables of which number corresponds to the number of jobs which together constitute the session.

In the step S903, the job management table 710 of the image input job 412 shown in FIG. 7 is formed on the memory 124 to hold various information until the job ends.

The job ID field 711 is to generate a unique job ID in the image input/output control apparatus and hold it. The job type field 712 is to specify a type of the generated job (above-described image input job and image output job). In the embodiment, the job type field 712 specifies and records the image input job 412 which is to sequentially record the image data expanded or decompressed by the RIP unit 8 into the storage unit 5. The job priority order field 713 is to hold priority of processing order of the job. The job status field 714 is to hold an execution state of the job (executable state, execution state, interruption state, end state, error state, or the like) according to the state. The page number field 715 is to hold the number of pages of the job. The page pointer field 716 is the pointer for the page management table 720 in which detailed information of each page managed by the job has been written. The page management table 720 is recorded on the HD 6.

The job parameter field 717 is to hold various setting parameters of the job. In the embodiment, if the HD 6 is not out of order, the contents of the print setting parameters (P11) to (P20) set in the step S901 are held.

In the case where the HD 6 is out of order and the page memory 125 is used instead, since the page memory 125 in the embodiment can store the image data (corresponding to A4/letter size) of 4 pages, the memory 125 can not temporarily store the image data of all the pages developed by the RIP unit 8. Namely, the memory 125 can not temporarily store all the image data of 20 pages designated at the parameter (P11). For this reason, it is limited to, e.g., circularly sort and output the plural prints, and perform print output after the recording of the final page ends (such as bookbinding layout). Therefore, in the step S903, the contents of the print setting parameters (P11) to (P20) set in the step S901 are changed as follows.

the number of pages: 20 pages (P111)
the number of prints: 1 print (P112)
one-face printing: yes (P113)
original size: A4 (P114)
sheet size: A4 (P115)
magnification/reduction rate: 100% (P116)
layout: no (P117)
page output order: ascending order (P118)
sort mode: yes (P119)
stapling: yes (P120)

That is, in the parameter (P112) the number of prints is changed from "10 prints" to "1 print", in the parameter (P117) the layout is changed from "bookbinding" to "no", and in the parameter (P119) the sort mode is changed from "no" to "yes". Then the changed print setting parameters (P111) to (P12) are held in the job parameter field 717.

Next, after the job management table 710 of the image input job is formed, the session control task (a) starts the image input job control task (b).

In the step S904, the job management table 730 of the image output job 401 is formed on the memory 124 to hold various information until the job ends.

The job ID field 731 is to generate a unique job ID in the image input/output control apparatus and hold it. The job type field 732 is to specify a type of the generated job (above-described image input job and image output job). In the embodiment, the job type field 732 specifies and records the image output job 401 which is to sequentially output the image data stored in the page memory 125 of the data processing unit 121 to the printer unit 2. The job priority order field 733 is to hold priority of processing order of the job. The job status field 734 is to hold an execution state of the job (executable state, execution state, interruption state, end state, error state, or the like) according to the state. The page number field 735 is to hold the number of pages of the job. The page pointer field 736 is the pointer for the page management table 740 in which detailed information of each page managed by the job has been written. The entity of the page management table 740 is identical with that of the page management table 720 recorded on the HD 6 with respect to the image input job 412.

The job parameter field 737 is to hold various setting parameters of the job. In the embodiment, the contents of the parameters (P111) to (P120) (the number of pages, the number of prints, the sheet size, the magnification/reduction rate, the one-face/two-face printing, the page output order, the sort output, the stapling and the like) which were set in the step S901 and then changed according to abnormality of the hard disk are held.

After the job management table 730 of the above-described image output job is formed, the session control task (a) starts the image output job control task (c).

In the step S905, processing of the generated image input job 412 starts. That is, the session control task (a) instructs the image input job control task (b) to start the job.

In the step S906, processing of the generated image output job 401 starts. That is, the session control task (a) instructs the image output job control task (c) to start the job.

In the step S907, the session control task (a) receives a job end notification from the image input job control task (b) and performs the end processing of the image input job. Namely, the job status (field) 714 of the job management table 710 of the image input job ends.

In the step S908, the session control task (a) receives a job end notification from the image output job control task (c) and performs the end processing of the image output job. Namely, the job status (field) 734 of the job management table 730 of the image output job ends.

In the stop S909, the end processing of the session is performed. Namely, the job management table 710 of the image input job, the job management table 730 of the image output job, and the image data for each page in the page management tables 720 and 740 are discarded, and thus the resources are released. Also, the session management table 700 is discarded, and thus the resources are released. Thus a series of processing ends.

Next, the image input job control task (b) in the PDL print session 501 will be explained.

In the step S911, the image input job control task (b) receives the job start instruction from the session control task (a). Then, if the image input job control task (b) does not execute another image input job and can receive a new image input job, the task (b) starts the instructed job.

In the step S912, the image data of one page expanded by the RIP unit 8 is received. Namely, the image is transferred from the RIP unit 8 to the data processing unit 121 through the I/F 120.

In the step S913, the image data transferred to the data processing unit 121 is temporarily stored in the page memory 125. It is also called that the transferred image data is primarily stored in the memory 125.

In the step S914, the image input job control task (b) transmits a page output request to the image output job control task (c). If reading of the image data of the corresponding page from the page memory 125 ends in the later-described image output job control task (c), the flow advances to the step S916. In this state, the area in the page memory 125 from which the image data was read acts as an area capable of storing another image data.

In the step S916, it is judged whether or not all the pages expanded in the RIP unit 8 and to be processed have been recorded as image data into the page memory 125 of the data processing unit 121. If the page not processed remains, the flow returns to the step S912. Conversely, if all the pages were processed, the flow advances to the step S917.

In the step S917, the image input job control task (b) transmits the image input job end notification to the session control task (a), and the task (b) ends. Thus, the job status (field) 714 in the job management table 710 of the image input job ends.

Next, the image output job control task (c) in the PDL print session will be explained.

In the step S921, the image output job control task (c) receives the job start instruction from the session control task (a). If the printer unit 2 is not used by another job and can perform a new printing operation, the task (c) starts the instructed job.

In the step S922, the output request of the image data temporarily stored in the page memory 125 is received from the image input job control task (b)

In the step S923, the image data reading from the page memory 125 starts.

In the step S924, after the use right (or usufruct) of the printer unit 2 is acquired, the image data of one page read from the page memory 125 is transferred to the printer unit 2 through the I/F 122. Thus, as described above, the printer unit 2 performs image formation and prints out the formed image.

In the step S925, it is judged whether or not the page output request from the image input job control task (b) corresponds to the final page. As a result, if the page not yet processed remains, the flow returns to the step S922. Conversely, if all the pages were processed, the stapling process is performed, and the flow advances to the step S930. By the processing up to this time, the printout of "the number of prints: 1 print (P112)" ends.

In the step S930, the end notification of the image output job is transmitted to the session control task (a), and the image output job control task (c) ends.

In the above-described example, it is explained the case where the image information is transferred as the PDL data from the PC/WS 11, the PDL data is expanded into the image data in the image input/output control apparatus, and the obtained data is then print output, in accordance with the print setting of the PC/WS 11. However, the above-described processing is also applicable to the case where the image information read by the reader unit 1 is print output.

Next, a second example of the session control and the job control to be performed in the case where the HD 6 of the image input/output control apparatus according to the embodiment is out of order will be explained with reference to FIGS. 9A to 9C. In the second example, the control procedures of the copy session 502, and the image input and output jobs 411 and 401 which together construct the session 502 will be explained. In this case, the image input job 411 is to sequentially record the image data read by the reader unit 1 into the storage unit 5, and the image output job 401 is to sequentially output the image data recorded in the page memory 125 of the data processing unit 121 to the printer unit 2.

Namely, if the HD 6 is out of order, like the above-described case of the PDL print session, the storage unit shown in FIGS. 4 and 5 is replaced with the page memory 125 of the data processing unit 121, and the processing is performed.

First, in the step S901, the user performs various copy setting on the operation unit 9 shown in FIG. 8. Ordinarily, the contents of the copy setting are the number of copies, a sheet size, a magnification/reduction rate, one-face/two-face copy, a sort output mode, stapling and the like. The user inputs such parameters by using the numeric keys 812 and the setting items displayed on the touch panel 816.

On the other hand, if the HD 6 is out of order, such a message as "HARD DISK IS OUT OF ORDER" is displayed on the touch panel 816 to limit the setting which can be performed in breakdown of the hard disk.

Figure 10:
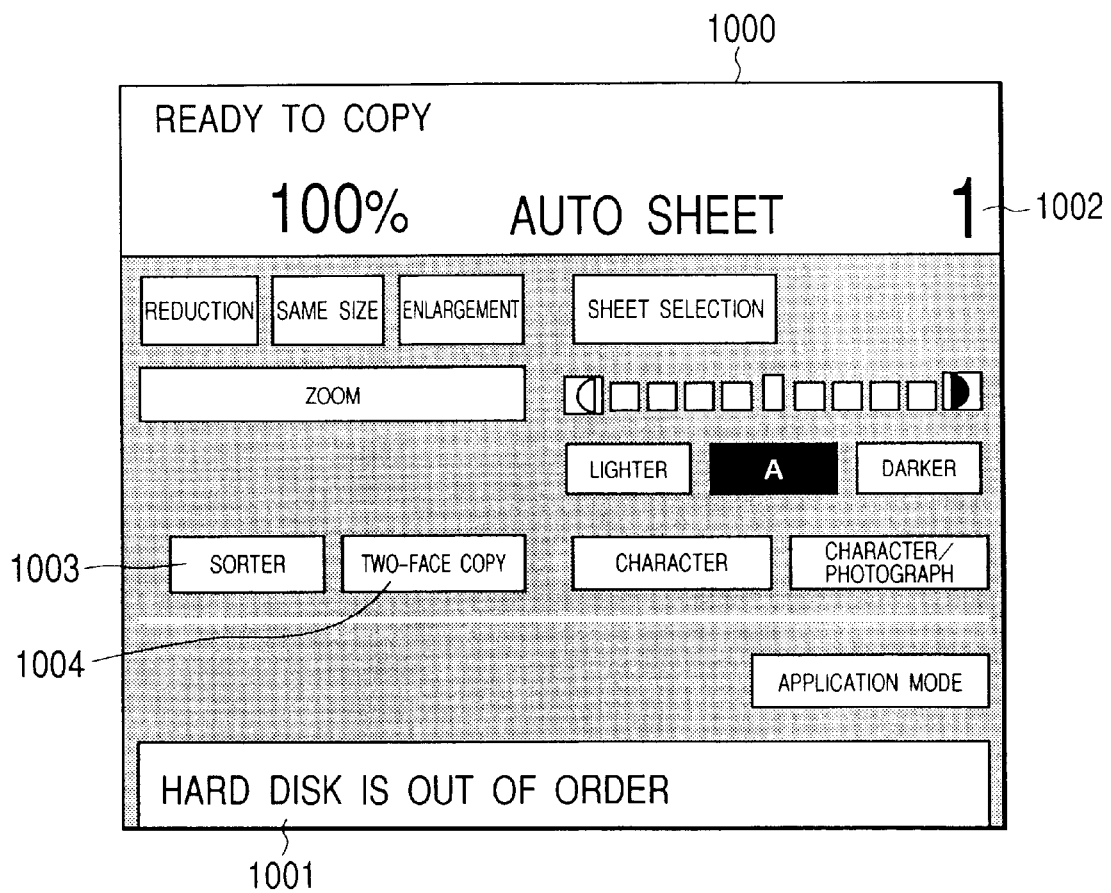
FIG. 10 is a view showing an example of displayed contents on the operation unit.

FIG. 10 shows an example of the touch panel 816. In the drawing, numeral 1000 denotes a touch panel itself, numeral 1001 denotes the message "HARD DISK IS OUT OF ORDER", numeral 1002 denotes the number of copies which is set by the numeric keys 812, numeral 1003 denotes a sort mode setting key, and numeral 1004 denotes a two-face copy mode setting key. In this displayed state, only the copy setting concerning a copy operation which does not use the hard disk is acceptable.

The contents of the setting which can be performed in the breakdown of the hard disk are the number of copies "1 copy", the sort mode "no", the layout "no", and the like. In this case, it is assumed that following parameters have been set in an example.

the number of copies: 1 copy (C11)
one-face copy: yes (C12)
sheet size: A4 (C13)
magnification/reduction rate: 100% (C14)
layout: no (C15)
sort mode: no (C16)
stapling: no (C17)

If another session exists during the copy setting or after the copy setting, such a message as "READY TO MODE SETTING" is displayed on the touch panel 816, and it is inhibited from accepting the start key 806. On the other hand, if another session does not exist, such a message as "READY TO COPY" is displayed on the touch panel 816, and it is allowed to accept the start key 806.

Then the user puts the original on the reader unit 1 and depresses the start key 806 to issue a copy instruction. The operation unit 9 transfers the set parameters (C11) to (C17) to the CPU 123 of the core unit 10 to issue a processing request.

In the step S940, it is possible to judge whether or not the session can be generated internally on the basis of the processing request issued from the operation unit 9. That is, if another session does not exist at this time, the flow advances to the step S902, while if another session exists, the process ends.

In the step S902, the core unit 10 divides an image processing function of one unit according to the processing request issued from the operation unit 9 into at least one image input job or one image output job. Then, in the core unit 10, the session constituted by the image input job or the image output job is generated and managed on the session management table 700 shown in FIG. 7. The session management table 700 holds various information until the session ends.

The session ID field 701 generates a unique session ID in the image input/output control apparatus and hold it. The session type field 702 is to specify a type of the generated session (PDL print session, copy session, facsimile transmission session, facsimile reception session, scan session, or the like). in the embodiment, the field 702 specifies and records the copy session. The session priority order field 703 holds priority of processing order of the session. The session status field 704 holds an execution state of the session (executable state, execution state, interruption state, end state, error state, or the like) according to the state. The link job number field 705 holds the number of the image input jobs and the image output jobs which together constitute the session. In the embodiment, since the copy session 502 is constituted by the two jobs, i.e., the image input job 411 and the image output job 401, as shown in FIG. 5, the number "2" is set to the link job number field 705. The first job pointer field 706 is the pointer for the job management table 710 of the image input job 411. The second job pointer field 707 is the pointer for the job management table 730 of the image output job 401.

In the step S903, the job management table 710 of the image input job 411 is formed on the memory 124 to hold various information until the job ends.

The job ID field 711 is to generate a unique job ID in the image input/output control apparatus and hold it. The job type field 712 is to specify a type of the generated job (above-described image input job and image output job). In the embodiment, the job type field 712 specifies and records the image input job 411 which is to sequentially record the image data read by the reader unit 1 into the page memory 125 of the data processing unit 121. The job priority order field 713 is to hold priority of processing order of the job. The job status field 714 is to hold an execution state of the job (executable state, execution state, interruption state, end state, error state, or the like) according to the state. The page number field 715 is to hold the number of pages of the job. The page pointer field 716 is the pointer for the page management table 720 in which detailed information of each page managed by the job has been written. The page management table 720 is recorded on the HD 6.

The job parameter field 717 is to hold various setting parameters of the job. In the embodiment, the contents of the copy setting parameters (C11) to (C17) set in the step S901 are hold.

After the job management table 710 of the image input job is formed, the session control task (a) starts the image input job control task (b).

In the step S904, the job management table 730 of the image output job 401 is formed on the memory 124 to hold various information until the job ends.

The job ID field 731 is to generate a unique job ID in the image input/output control apparatus and hold it. The job type field 732 is to specify a type of the generated job (above-described image input job and image output job). In the embodiment, the job type field 732 specifies and records the image output job 401 which is to sequentially output the image data stored in the page memory 125 of the data processing unit 121 to the printer unit 2. The job priority order field 733 is to hold priority of processing order of the job. The job status field 734 is to hold an execution state of the job (executable state, execution state, interruption state, end state, error state, or the like) according to the state. The page number field 735 is to hold the number of pages of the job. The page pointer field 736 is the pointer for the page management table 740 in which detailed information of each page managed by the job has been written. The entity of the page management table 740 is identical with that of the page management table 720 recorded on the HD 6 with respect to the image input job 411.

The job parameter field 737 is to hold various setting parameters of the job. In the embodiment, the contents of the parameters (C11) to (C17) which respectively concern the number of copies, the sheet size, the magnification/reduction rate, the one-face/two-face copy, the sort output, the stapling and the like and were set in the step S901 are held.

After the job management table 730 of the image output job is formed, the session control task (a) starts the image output job control task (c).

In the step S905, processing of the generated image input job 411 starts. That is, the session control task (a) instructs the image input job control task (b) to start the job.

In the step S906, processing of the generated image output job 401 starts. That is, the session control task (a) instructs the image output job control task (c) to start the job.

In the step S907, the session control task (a) receives a job end notification from the image input job control task (b) and performs the end processing of the image input job. Namely, the job status (field) 714 of the job management table 710 of the image input job ends.

In the step S908, the session control task (a) receives a job end notification from the image output job control task (c) and performs the end processing of the image output job. Namely, the job status (field) 734 of the job management table 730 of the image output job ends.

In the step S909, the end processing of the session is performed. Namely, the job management table 710 of the image input job, the job management table 730 of the image output job, and the image data for each page in the page management tables 720 and 740 are discarded, and thus the resources are released. Also, the session management table 700 is discarded, and thus the resources are released. Thus a series of processing ends.

Next, the image input job control task (b) in the copy session 502 will be explained.

In the step S911, the image input job control task (b) receives the job start instruction from the session control task (a). Then, if the reader unit 1 is not used by another image input job and a new image input job is acceptable, the task (b) starts the instructed job.

In the step S912, the image data of one page read by the reader unit 1 is received. Namely, the image is transferred from the reader unit 1 to the data processing unit 121 through the I/F 120.

In the step S913, the image data transferred to the data processing unit 121 is temporarily stored in the page memory 125. It is also called that the transferred image data is primarily stored in the memory 125.

In the step S914, the image input job control task (b) transmits a page output request to the image output job control task (c). If reading of the image data of the corresponding page from the page memory 125 ends in the image output job control task (c), the flow advances to the step S916. In this state, the area in the page memory 125 from which the image data was read acts as an area capable of storing another image data.

In the step S916, it is judged whether or not all the pages read by the reader unit 1 and to be processed have been recorded as image data into the page memory 125 of the data processing unit 121. If the page not processed remains, the flow returns to the step S912. Conversely, if all the pages were processed, the flow advances to the step S917.

In the step S917, the image input job control task (b) transmits the image input job end notification to the session control task (a), and the task (b) ends.

Thus, the job status (field) 714 in the job management table 710 of the image input job ends.

Since the processing in the step S921 and the following steps of the image output job control task (c) in the copy session 502 are identical with those in the above-described PDL print session 501, the detailed explanation thereof is omitted.

In the above-described examples, the PDL print session 501 and the copy session 502 are explained. However, as the expanded example in FIG. 5, even if an arbitrary session is constructed by combining an arbitrary image input job and an arbitrary image output job with each other, the control procedure in the embodiment is also applicable to such the arbitrary session.

Although the present invention has been explained by using the preferred embodiment, the present invention is not limited to this. That is, various modifications and changes are possible in the present invention without departing from the spirit and scope of the appended claims.

What is claimed is:

1. An image input/output apparatus comprising:

input means for inputting image data from at least one image input unit;

temporary storage means for temporarily storing the image data;

secondary storage means for storing the image data temporarily stored in said temporary storage means, a capacity of said secondary storage means being larger than that of said temporary storage means;

output means for outputting the image data to at least one image output unit;

detection means for detecting abnormality of said secondary storage means; and control means for controlling the input and output of the image data in accordance with an image processing parameter representing image processing of one unit to be executed, wherein said control means divides the image processing represented by the image processing parameter into an image input job to input the image data with said input means and an image output job to output the image data with said output means, and said control means independently controls execution of the image input job and execution of the image output job in accordance with the abnormality detection result of said secondary storage means obtained by said detection means, wherein, in a case where the abnormality of said secondary storage means is detected by said detection means, said control means changes the image processing parameter for an image processing parameter representing the image processing executable without using said secondary storage means, and independently controls the execution of the image input job and the execution of the image output job in accordance with the changed image processing parameter.

2. An apparatus according to 1, wherein said image input unit is a reader.

3. An apparatus according to claim 1, wherein said image output unit is a printer.

4. An apparatus according to claim 1, wherein said secondary storage means is a hard disk.

5. An image input/output apparatus comprising:

input means for inputting image data from at least one image input unit;

temporary storage means for temporarily storing the image data;

secondary storage means for storing the image data temporarily stored in said temporary storage means, a capacity of said temporary storage means being larger than that of said temporary storage means;

output means for outputting the image data to at lease one image output unit;

detection means for detecting abnormality of said secondary storage means; and control means for controlling the input and output of the image data in accordance with an image processing parameter representing image processing of one unit to be executed, wherein said control means divides the image processing represented by the image processing parameter into an image input job to input the image data with said input means and an image output job to output the image data with said output means, and said control means independently controls execution of the image input job and execution of the image output job in accordance with the abnormality detection result of said secondary storage means obtained by said detection means; and setting means for setting a desired image processing parameter, and wherein, in a case where the abnormality of said secondary storage means is detected by said detection means, said setting means is inhibited from setting the image processing parameter representing the image processing using said secondary storage means.

6. An apparatus according to claim 5, wherein said image input unit is a reader.

7. An apparatus according to claim 5, wherein said image output unit is a printer.

8. An apparatus according to claim 5, wherein said secondary storage means is a hard disk.

9. An image input/output apparatus comprising:

input means for inputting image data from at least one image input unit;

temporary storage means for temporarily storing the image data;

secondary storage means for storing the image data temporarily stored in said temporary storage means, a capacity of said secondary storage means being larger than that of said temporary storage means;

output means for outputting the image data to at least one image output unit;

detection means for detecting abnormality of said secondary storage means; and control means for controlling the input and output of the image data in accordance with an image processing parameter representing image processing of one unit to be executed, wherein said control means divides the image processing represented by the image processing parameter into an image input job to input the image data with said input means and an image output job to output the image data with said output means, and said control means independently controls execution of the image input job and execution of the image output job in accordance with the abnormality detection result of said secondary storage means obtained by said detection means, wherein said control means independently controls the execution of the image input job and the execution of the image output job, such that in a case where the abnormality of said secondary storage means is not detected by said detection means the image data input by said input means is stored into said secondary storage means through said temporary storage means, and the image data stored in said secondary storage means is output by said output means through said temporary storage means, and in a case where the abnormality of said secondary storage means is detected by said detection means, the image data input by said input means is stored into said temporary storage means, and the image data stored in said temporary storage means is output by said output means without passing said secondary storage means.

10. An apparatus according to claim 9, wherein said image input unit is a reader.

11. An apparatus according to claim 9, wherein said image output unit is a printer.

12. An apparatus according to claim 9, wherein said secondary storage means is a hard disk.

13. An image input/output method for an image input/output apparatus which comprises temporary storage means for temporarily storing image data, and secondary storage means for storing the image data temporarily stored in the temporary storage means, a capacity of the secondary storage means being larger than that of the temporary storage means, and wherein the image data is input from at least one image input unit, and the input image data is output to at least one image output unit, said method comprising:

a step of dividing image processing of one unit to be executed into an image input job to input the image data from the input means and an image output job to output the image data to the output means;

a step of detecting abnormality of the secondary storage means;

a step of independently controlling execution of the image input job and execution of the image output job in accordance with the abnormality detection result of the secondary storage means; and a step of changing, in a case where the abnormality of the secondary storage means is detected, the image input job and the image output job respectively for an image input job and an image output job executable without using the secondary storage means.

14. A method according to claim 13, wherein the image input unit is a reader.

15. A method according to claim 13, wherein the image output unit is a printer.

16. A method according to claim 13, wherein the secondary storage means is a hard disk.

17. An image input/output method for an image input/output apparatus which comprises temporary storage means for temporarily storing image data, and secondary storage means for storing the image data temporarily stored in the temporary storage means, a capacity of the secondary storage means being larger than that of the temporary storage means, and wherein the image data is input from at least one image input unit, and the input image data is output to at least one image output unit, said method comprising:

a step of dividing image processing of one unit to be executed into an image input job to input the image data from the input means and an image output job to output the image data to the output means;

a step of detecting abnormality of the secondary storage means;

a step of independently controlling execution of the image input job and execution of the image output job in accordance with the abnormality detection result of the secondary storage means;

a step of setting desired image processing; and a step of inhibiting, in a case where the abnormality of the secondary storage means is detected, setting of the image processing using the secondary storage means.

18. A method according to claim 17, wherein the image input unit is a reader.

19. A method according to claim 17, wherein the image output unit is a printer.

20. A method according to claim 17, wherein the secondary storage means is a hard disk.

21. An image processing system which outputs image data input from at least one image input means to at least one image output means, comprising:

temporary storage means for temporarily storing the image data;

secondary storage means for storing the image data temporarily stored in said temporary storage means, a capacity of said secondary storage means being larger than that of said temporary storage means;

detection means for detecting abnormality of said secondary storage means; and control means for controlling the input and output of the image data in accordance with an image processing parameter representing image processing of one unit to be executed, wherein said control means divides the image processing represented by the image processing parameter into an image input job to input the image data from said image input means and an image output job to output the image data to said image output means, and said control means independently controls execution of the image input job and execution of the image output job in accordance with the abnormality detection result of said secondary storage means obtained by said detection means, wherein, in a case where the abnormality of said secondary storage means is detected by said detection means, said control means changes the image processing parameter for an image processing parameter representing the image processing executable without using said secondary storage means, and independently controls the execution of the image input job and the execution of the image output job in accordance with the changed image processing parameter.

22. A system according to claim 21, wherein said image input means is a reader.

23. A system according to claim 21, wherein said image output means is a printer.

24. A system according to claim 21, wherein said secondary storage means is a hard disk.

25. An image processing system which outputs image data input from at least one image input means to at least one image output means, comprising:

temporary storage means for temporarily storing the image data;

secondary storage means for storing the image data temporarily stored in said temporary storage means, a capacity of said secondary storage means being larger than that of said temporary storage means;

detection means for detecting abnormality of said secondary storage means; and control means for controlling the input and output of the image data in accordance with the image processing parameter representing image processing of one unit to be executed, wherein said control means divides the image processing represented by the image processing parameter into an image input job to input the image data from said image input means and an image output job to output the image data to said image output means, and said control means independently controls execution of the image input job and execution of the image output job in accordance with the abnormality detection result of said secondary storage means obtained by said detection means;

setting means for setting a desired image processing parameter, and wherein, in a case where the abnormality of said secondary storage means is detected by said detection means, said setting means is inhibited from setting the image processing parameter representing the image processing using said secondary storage means.

26. A system according to claim 25, wherein said image input means is a reader.

27. A system according to claim 25, wherein said image output means is a printer.

28. A system according to claim 25, wherein said secondary storage means is a hard disk.

29. An image processing system which outputs image data input from at least one image input means to at least one image output means, comprising:

temporary storage means for temporarily storing the image data;

secondary storage means for storing the image data temporarily stored in said temporary storage means, a capacity of said secondary storage means being larger than that of said temporary storage means;

detection means for detecting abnormality of said secondary storage means; and control means for controlling the input and output of the image data in accordance with an image processing parameter representing image processing of one unit to be executed, wherein said control means divides the image processing represented by the image processing parameter into an image input job to input the image data from said image input means and an image output job to output the image data to said image output means, and said control means independently controls execution of the image input job and the execution of the image output job in accordance with the abnormality detection result of said secondary storage means obtained by said detection means, wherein said control means independently controls the execution of the image data input job and the execution of the image output job, such that in a case where the abnormality of said secondary storage means is not detected by said detection means, the image data input from said image input means is stored into said secondary storage means through said temporary storage means, and the image data stored in said secondary storage means is output to said image output means through said temporary storage means, and in a case where the abnormality of said secondary storage means is detected by said detection means, the image data input from said image input means is stored into said temporary storage means, and the image data stored in said temporary storage means is output to said image output means without passing through said secondary storage means.

30. A system according to claim 29, wherein said image input means is a reader.

31. A system according to claim 29, wherein said image output means is a printer.

32. A system according to claim 29, wherein said secondary storage means is a hard disk.

33. An image processing apparatus comprising:

input means for inputting image data from at least one image input unit;

temporary storage means for temporarily storing the image data;

secondary storage means for storing the image data temporarily stored in said temporary storage means, a capacity of said secondary storage means being larger than that of said temporary storage means;

output means for outputting the image data to at least one image output unit;

detection means for detecting abnormality of said secondary storage means; and processing means for processing the image data in accordance with an image processing parameter representing image processing to be executed and the abnormality detection result of said secondary storage means obtained by said detection means, wherein, in a case where the abnormality of said secondary storage means is detected by said detection means, said processing means changes the image processing parameter for an image processing parameter representing the image processing executable without using said secondary storage means, and processes the image data in accordance with the changed image processing parameter.

34. An apparatus according to claim 33, wherein said image input unit is a reader.

35. An apparatus according to claim 33, wherein said image output unit is a printer.

36. An apparatus according to claim 33, wherein said secondary storage means is a hard disk.

37. An image processing apparatus comprising:

input means for inputting image data from at least one image input unit;

temporary storage means for temporarily storing the image data;

secondary storage means for storing the image data temporarily stored in said temporary storage means, a capacity of said secondary storage means being larger than that of said temporary storage means;

output means for outputting the image data to at least one image output unit;

detection means for detecting abnormality of said secondary storage means;

processing means for processing the image data in accordance with an image processing parameter representing image processing to be executed and the abnormality detection result of said secondary storage means obtained by said detection means; and setting means for setting a desired image processing parameter, and wherein, in a case where the abnormality of said secondary storage means is detected by said detection means, said setting means is inhibited from setting the image processing parameter representing the image processing using said secondary storage means.

38. An apparatus according to claim 37, wherein said image input unit is a reader.

39. An apparatus according to claim 37, wherein said image output unit is a printer.

40. An apparatus according to claim 37, wherein said secondary storage means is a hard disk.

41. An image processing apparatus comprising:

input means for inputting image data from at least one image input unit;

temporary storage means for temporarily storing the image data;

secondary storage means for storing the image data temporarily stored in said temporary storage means, a capacity of said secondary storage means being larger than that of said temporary storage means;

output means for outputting the image data to at lease one image output unit;

detection means for detecting abnormality of said secondary storage means; and processing means for processing the image data in accordance with an image processing parameter representing image processing to be executed and the abnormality detection result of said secondary storage means obtained by said detection means, wherein said processing means processes the image data such that in a case where the abnormality of said secondary storage means is not detected by said detection means, the image data input by said input means is stored into said secondary storage means through said temporary storage means, and the image data stored in said secondary storage means is output by said output means through said temporary storage means, and in a case where the abnormality of said secondary storage means is detected by said detection means, the image data input by said input means is stored into said temporary storage means, and the image data stored in said temporary storage means is output by said output means without passing through said secondary storage means.

42. An apparatus according to claim 41, wherein said image input unit is a reader.

43. An apparatus according to claim 41, wherein said image output unit is a printer.

44. An apparatus according to claim 41, wherein said secondary storage means is a hard disk.

45. An image processing method for an image processing apparatus which comprises temporary storage means for temporarily storing image data, and secondary storage means for storing the image data temporarily stored in the temporary storage means, a capacity of the secondary storage means being larger than that of the temporary storage means, and wherein the image data is input from at least one image input unit, and the input image data is output to at least one image output unit, said method comprising:

a step of detecting abnormality of the secondary storage means;

a step of processing the image data in accordance with an image processing parameter representing image processing to be executed and the abnormality detection result of the secondary storage means; and a step of changing, in a case where the abnormality of the secondary storage means is detected, the image processing parameter for an image processing parameter representing the image processing executable without using the secondary storage means.

46. A method according to claim 45, wherein the image input unit is a reader.

47. A method according to claim 45, wherein the image output unit is a printer.

48. A method according to claim 45, wherein the secondary storage means is a hard disk.

49. An image processing method for an image processing apparatus which comprises temporary storage means for temporarily storing image data, and secondary storage means for storing the image data temporarily stored in the temporary storage means, a capacity of the secondary storage means being larger than that of the temporary storage means, and wherein the image data is input from at least one image input unit, and the input image data is output to at least one image output unit, said method comprising:

a step of detecting abnormality of the secondary storage means;

a step of processing the image data in accordance with an image processing parameter representing image processing to be executed and the abnormality detection result of the secondary storage means;

a step of setting a desired image processing parameter; and a step of inhibiting, in a case where the abnormality of the secondary storage means is detected, setting of the image processing using the secondary storage means.

50. A method according to claim 49, wherein the image input unit is a reader.

51. A method according to claim 49, wherein the image output unit is a printer.

52. A method according to claim 49, wherein the secondary storage means is a hard disk.

53. An image processing system which outputs image data input from at least one image input means to at least one image output means, comprising:

temporary storage means for temporarily storing the image data;

secondary storage means for storing the image data temporarily stored in said temporary storage means, a capacity of said secondary storage means being larger than that of said temporary storage means;

detection means for detecting abnormality of said secondary storage means; and processing means for processing the image data in accordance with an image processing parameter representing image processing to be executed and the abnormality detection result of said secondary storage means obtained by said detection means, wherein, in a case where the abnormality of said secondary storage means is detected by said detection means, said processing means changes the image processing parameter for an image processing parameter representing the image processing executable without using said secondary storage means, and processes the image data in accordance with the changed image processing parameter.

54. A system according to claim 53, wherein said image input means is a reader.

55. A system according to claim 53, wherein said image output means is a printer.

56. A system according to claim 53, wherein said secondary storage means is a hard disk.

57. An image processing system which outputs image data input from at least one image input means to at lease one image output means, comprising:

temporary storage means for temporarily storing the image data;

secondary storage means for storing the image data temporarily stored in said temporary storage means, a capacity of said secondary storage means being larger than that of said temporary storage means;

detection means for detecting abnormality of said secondary storage means;

processing means for processing the image data in accordance with an image processing parameter representing image processing to be executed and the abnormality detection result of said secondary storage means obtained by said detection means; and setting means for setting a desired image processing parameter, and wherein, in a case where the abnormality of said secondary storage means is not detected by said detection means, said setting means is inhibited from setting the image processing parameter representing the image processing using said secondary storage means.

58. A system according to claim 57, wherein said image input means is a reader.

59. A system according to claim 57, wherein said image output means is a printer.

60. A system according to claim 57, wherein said secondary storage means is a hard disk.

61. An image processing system which outputs image data input from at least one image input means to at lease one image output means, comprising:

temporary storage means for temporarily storing the image data;

secondary storage means for storing the image data temporarily stored in said temporary storage means, a capacity of said secondary storage means being larger than that of said temporary storage means;

detection means for detecting abnormality of said secondary storage means; and processing means for processing the image data in accordance with an image processing parameter representing image processing to be executed and the abnormality detection result of said secondary storage means obtained by said detection means, wherein said processing means processes the image data such that in a case where the abnormality of said secondary storage means is not detected by said detection means, the image data input from said image input means is stored into said secondary storage means through said temporary storage means, and the image data stored in said secondary storage means is output to said image output means through said temporary storage means, and in a case where the abnormality of said secondary storage means is detected by said detection means, the image data input from said image input means is stored into said temporary storage means, and the image data stored in said temporary storage means is output to said image output means without passing through said secondary storage means.

62. A system according to claim 61, wherein said image input means is a reader.

63. A system according to claim 61, wherein said image output means is a printer.

64. A system according to claim 61, wherein said secondary storage means is a hard disk.

* * * * *

UNITED STATES PATENT AND TRADEMARK OFFICE
CERTIFICATE OF CORRECTION

PATENT NO. : 6,307,615 B1
DATED : October 23, 2001
INVENTOR(S) : Hirohiko Ito

It is certified that error appears in the above-identified patent and that said Letters Patent is hereby corrected as shown below:

Column 1,
Lines 52 and 53, "can not" should read -- cannot --.

Column 5,
Line 49, "original" should read -- originals --.

Column 6,
Line 2, "generate" should read -- generated --;
Line 10, "T he" should read -- The --;
Line 19, "t he" should read -- the --;
Line 21, "refeed" should read -- re-feed --;
Line 27, "transferr ed" should read -- transferred --;
Line 54, "is" should read -- are --; and
Line 64, "an" should read -- a --.

Column 7,
Line 51, "job." should read -- jobs. --.

Column 9,
Line 34, "ID" should read -- HD --; and
Line 53, "all" should read -- an --.

Column 10,
Line 55, "is" should read -- are --.

Column 12,
Line 11, "setting" should read -- settings --; and
Line 57, "hold" should read -- holds --.

Column 14,
Line 47, "is" should read -- are --.

Column 15,
Line 25, "HID" should read -- HD --; and
Line 53, "date" should read -- data --.

Column 16,
Line 51, "can not" should read -- cannot --.

Column 17,
Line 51, "can not" should read -- cannot --; and
Line 53, "can not" should read -- cannot --.

UNITED STATES PATENT AND TRADEMARK OFFICE
CERTIFICATE OF CORRECTION

PATENT NO.   : 6,307,615 B1
DATED        : October 23, 2001
INVENTOR(S)  : Hirohiko Ito It is certified that error appears in the above-identified patent and that said Letters Patent is hereby corrected as shown below:

Column 18,
Line 10, "(P12)" should read -- (P112) --; and
Line 63, "stop" should read -- step --.

Column 19,
Line 46, "task (b)" should read -- task (b). --;
Line 61, "of"the" should read -- of "the --.

Column 20,
Line 24, "setting" should read -- settings --; and
Line 25, "setting" should read -- settings --.

Column 21,
Line 16, "hold" should read -- holds --;
Line 20, "in" should read -- In --; and
Line 59, "hold." should read -- held. --.

Column 23,
Line 15, "ends." (close right margin); and
Line 16, "¶ Thus," (close left margin).

Column 24,
Line 21, "lease" should read -- least --; and
Line 25, "and" should be deleted.

Column 27,
Line 15, "and" should be deleted; and
Line 30, "mean;" should read -- means; and --.

Column 29,
Line 33, "lease" should read -- least --.

Column 31,
Line 16, "lease" should read -- least --.

UNITED STATES PATENT AND TRADEMARK OFFICE
CERTIFICATE OF CORRECTION

PATENT NO. : 6,307,615 B1
DATED : October 23, 2001
INVENTOR(S) : Hirohiko Ito

It is certified that error appears in the above-identified patent and that said Letters Patent is hereby corrected as shown below:

Column 32,
Line 3, "lease" should read -- least --.

Signed and Sealed this

Ninth Day of April, 2002

Attest:

JAMES E. ROGAN
*Attesting Officer*  *Director of the United States Patent and Trademark Office*